(12) United States Patent
Obana et al.

(10) Patent No.: US 6,555,779 B1
(45) Date of Patent: Apr. 29, 2003

(54) UNDERWATER PROCESSING DEVICE AND UNDERWATER PROCESSING METHOD

(75) Inventors: Takeshi Obana, Hitachi (JP); Kunio Miyazaki, Hitachi (JP); Hisanori Okamura, Tokai (JP); Takeshi Tsukamoto, Hitachi (JP); Takahiko Kato, Hitachinaka (JP); Masato Koshiishi, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/650,689

(22) Filed: Aug. 30, 2000

(30) Foreign Application Priority Data

Feb. 7, 2000 (JP) .......................... 2000-034308

(51) Int. Cl.$^7$ .............................................. B23K 26/24
(52) U.S. Cl. ............................... 219/121.63; 219/121.84
(58) Field of Search .................... 219/121.63, 121.64, 219/121.65, 121.66, 121.67, 121.68, 121.69, 121.84, 74; 376/260

(56) References Cited

U.S. PATENT DOCUMENTS

| | | | | |
|---|---|---|---|---|
| 3,967,090 A | * | 6/1976 | Hamasaki et al. | 219/70 |
| 4,052,632 A | * | 10/1977 | Sagara et al. | 219/137 R |
| 4,816,637 A | * | 3/1989 | Sanders et al. | 219/121.59 |
| 5,977,515 A | | 11/1999 | Uraki et al. | |
| 5,981,896 A | * | 11/1999 | Keanini et al. | 219/74 |
| 6,060,686 A | * | 5/2000 | Jones | 219/121.84 |
| 6,146,094 A | * | 11/2000 | Obana et al. | 415/200 |
| 6,328,197 B1 | * | 12/2001 | Gapihan | 228/144 |

FOREIGN PATENT DOCUMENTS

| | | |
|---|---|---|
| JP | 55-116785 | 2/1954 |
| JP | 49-79939 | 8/1974 |
| JP | 56-6782 | 1/1981 |
| JP | 56-141965 | 11/1981 |

OTHER PUBLICATIONS

English–language Abstract of JP 08–001326, published Jan. 9, 1996, Paten Abstracts of Japan, vol. 1996, No. 05.
English–language Abstract of JP 06–289183, published Oct. 18, 1994, Patent Abstracts of Japan, vol. 1995, No. 01.
English–language Abstract of JP 07–132372, published May 23, 1995, Patent Abstracts of Japan, vol. 1995, No. 08.

* cited by examiner

Primary Examiner—Tom Dunn
Assistant Examiner—Jonathan Johnson
(74) Attorney, Agent, or Firm—Mattingly, Stanger & Malur, P.C.

(57) ABSTRACT

Provided are an underwater processing apparatus which can effectively prevent water from entering a shield for a workpiece having a surface ruggedness, and in which variation in a gas flow for a processing part is reduced, a processing method and an application thereof to a nuclear reactor, and the under water processing device is composed of a shield means which locally cover the processing part with the gas in order to prevent water from entering the shield member, the shield means having a solid wall formed of a member which is slidable in a part where it make contact with the workpiece, and adapted to make contact with the workpiece and to be moved up and down by a pressing force, and a water jetting means for forming a water curtain around the outer periphery of the solid wall.

6 Claims, 11 Drawing Sheets

WELDING LINE DIRECTION

WELDING LINE DIRECTION

UNDERWATER PROCESSING DEVICE AND UNDERWATER PROCESSING METHOD

BACKGROUND OF THE INVENTION

1. Field of the Invention

The present invention relates to a novel underwater processing apparatus and an underwater processing method, as well as to an automatic underwater processing apparatus, and in particular to a device for and a method of carrying out cutting, grinding, welding and surface-treatment in order to install, repair and process equipments belonging to nuclear facilities, marine vessels, bridges or the like.

2. Related Art

Conventionally, in the case of underwater processing metal or nonmetal, for example, in the case of underwater welding, in a method of carrying out a covered arc welding in an atmosphere in which no water is displaced therefrom, that is, the so-called wet process, a defect such as blow-holes are likely to be formed in a joint part or the like, and accordingly, a problem in view of reliability has been raised. Further, in a dry type process in which a part to be welded is surrounded by a water drainage chamber in its entirety, water in the chamber is displaced with air or shield gas, and then welding which has been carried out on the ground is directly carried out within the chamber, the drainage chamber should have a shape corresponding to that of the part to be welded. Thus, the facility becomes expensive. Accordingly, a local dry process wherein a cave from which water is displaced locally around a part to be processed, is defined, and welding, surface-treatment or the like is carried out within the cave, (which process will be hereinbelow referred as "a local shield method"), has been most prosperously used as an underwater processing method.

It is important for processing in the local shield process to stably displace water from the local shield, and accordingly, various methods have been proposed in order to stably displace water from the local shield. For example, Japanese Patent Laid-Open No. S49-799939 discloses such a method in which triple shield gas nozzles are used, a first jet nozzle jetting shield gas, a second jet nozzle jetting gas in the form of a high velocity jet stream, and a third jet nozzle jetting water in the form of a high velocity jet stream in order to create a stable gas phase zone in the shield.

Further, Japanese Laid-Open Utility Model No. S55-116785 discloses a welding torch having a skirt shape partition member made of carbon fibers or the like, and provided in a skirt portion of a local shield.

Further, Japanese Patent Laid-Open No. S56-141956 proposes a method in which a slidable solid wall is provided in the front end part of a jet stream welding nozzle, being separated from and opposed to a torch so that its front end is made into contact with a mother material by means of a processing mechanism (a spring) while another front end part of the nozzle front end part is opened.

Further, Japanese Laid-Open Patent No. S56-6782 discloses a method in which metal or nonmetal thin wires are bundled so as to be formed into an annular brush-like flexible wall. Heat-resistant stainless steel wires are preferably used as the metal thin wires, and carbon fibers are preferably used as the nonmetal thin wires.

However, in such a technical field that high quality is earnestly desirable for a processed part in a device belonging to, for example, a nuclear installation, affection by a bit of remaining moisture in a local shield would be caused. In a general utility field in which a marine vessel, a bridge or the like is repaired, it is desirable to obtain a highly reliable processed part. Finally, it is most desirable that the above-mentioned welding part is surrounded by the displacement chamber in its entirety, so as to obtain a processing part which is near, as possible as it can, to a processing part obtained by using a dry type process in which water in the displacement chamber is displaced with air or shield gas. However, it can be hardly achieved in the above-mentioned conventional technology. Japanese Laid-Open Patent No. S49-79939 discloses the provision of a third nozzle for jetting water at a high velocity so as to form a water curtain in order to prevent water from entering the local shield. However such a water curtain may not completely prevent water from entering into the local shield if a workpiece is complicated in its shape.

Further, in the method disclosed in the Japanese Laid-Open Utility Mode No. S55-116785, the pressing force of a welder relies upon a force adjusted by a worker himself, and accordingly, high skill is required for preventing water from entering. Further, repairing in a nuclear reactor can not be carried out by this method due to the presence of radio-active rays.

Further, in the Japanese Laid-Open Patent No. S56-141965, the slidable solid wall is not the one which completely shields the outer periphery of the torch in order to make contact with the mother material, and further, if the workpiece has a complicated shape, it would be impossible to completely prevent water from entering.

Further, in the Japanese Laid-Open Patent No. S56-6782, the flexible wall which is formed by bundling thin wires in a brush-like shape may not be completely prevent water from entering if a workpiece has a complicated shape.

SUMMARY OF THE INVENTION

An object of the present invention is to provide an underwater processing apparatus and an underwater processing method, which can effectively prevent water from entering a shield even though a workpiece has recesses and protrusions, and which can reduce variation of gas flow for a part to be processed, and also to provide an automatic underwater processing apparatus, and the application thereof to a nuclear reactor.

To the end according to the present invention, there is provided an underwater processing apparatus including a shield means for locally shielding a part to be processed of a workpiece with gas in an underwater environment in order to prevent water from entering the shield, for underwater processing the workpiece underwater, wherein the shield means is composed of a solid wall formed of a member having a slidable part making contact with the workpiece, and adapted to be made into contact with the workpiece and to be vertically movable by a pressing force, and a water jetting means for creating a water stream curtain around the outer periphery of the solid wall.

If the above-mentioned processing is accompanied with heating within the shield, it is preferable to introduce non-oxidative gas.

In combination of the water steam curtain, the gas shield around the solid wall according to the present invention, can prevent water from entering into a part to be processed, and the supply volume of gas for the gas shield can be reduced while variation in the supply volume of the gas can be decreased, thereby it is possible to stably carry out processing such as welding.

In particular, a stable gas shield is indispensable for welding with low input heat.

Further, according to the present invention, there is provided an underwater processing apparatus including a shield means for locally covering a part to be welded of a workpiece in order to prevent water from entering thereinto, in which nonoxidative gas is introduced into the shield means while a welding bevel of the workpiece is moved along a welding edge during welding, wherein an opening part is formed around the outer periphery of a torch for carrying out buildup welding in the welding bevel of the workpiece, facing the workpiece, a solid wall similar to the above-mentioned solid wall, formed of a slidable member is provided in a skirt part which makes contact with the workpiece so as to cover the entire welding width in a direction orthogonal to the direction of a welding line, and water jet nozzles for creating a water stream curtain around the outer periphery of the solid wall is provided. As a heat source, arc or laser may be used. The arc is more preferable for welding with low heat, using a high frequency pulse current.

Further, the above-mentioned water jet nozzles are provided along the welding bevel of the workpiece so as to be opened in front and rear of the welding bevel of the workpiece in the direction of the welding line, and are widened toward the welding bevel of the workpiece while having water jet ports which are longer than that of the width of the welding bevel of the workpiece. It is preferable that the water jet ports are opposed to the workpiece and have any one of a triangular shape, a rectangular shape, a polygonal shape, a crescent shape, an elliptic shape, a combination thereof.

Further it is preferable that the above-mentioned shield means has such a function that water is prevented from entering into the bevel of the workpiece, and the welding torch can be moved to and from the welding bevel of the workpiece, independent from the shield means.

Further, it is preferable that the shield means is provided with an illumination device for illuminating the interior of the shield means, an optical monitoring device for optically monitoring the interior of the shield means, a detector for detecting a pressure in the shield means so as to deliver an electrical signal indicating the pressure, and a control means for comparing the pressure with a preset pressure so as to control the pressure.

Further, it is preferable that the underwater processing apparatus is provided with a detector for detecting a water depth so as to deliver an electric signal, and is incorporated with a function in which the electric signal from the detector is converted into an underwater pressure.

The underwater processing apparatus according to the present invention can be used as a laser processing apparatus, a laser welding apparatus or a laser surface reforming apparatus.

Further, the underwater processing apparatus according to the present invention can be installed so as to be moved in an underwater environment on a rail or with no track, and accordingly, checking, inspection, grinding, repair and surface reformation of a structure can be carried out in the underwater environment. An underwater working machine incorporating this underwater processing apparatus is provided with a mechanism which allows it to move along a wall surface of the underwater structure, and further, the underwater working machine is provided with a working tool fixing part onto which an underwater tool unit is attached in order to carry out the above-mentioned underwater work.

Further, under remote-control from the outside of the underwater environment, the above-mentioned underwater working machine is sunk into the underwater environment and then set to a predetermined position in order to carry out ultrasonic flaw detection, shot-peening, water-jet peening, grinding and the like.

It is preferable that the above-mentioned welding torch according to the present invention can be moved to and from the welding bevel of the working piece, independent from the above-mentioned shield.

According to the present invention, there is provided an underwater processing apparatus comprising a torch having an arc electrode or a laser torch for projecting a laser beam, a torch body for supporting the torch, a solid wall provided on the workpiece side of the torch body so as to surround the entire periphery of the torch, and adapted to make contact with the workpiece and to be moved up and down by a pressing force, a water let nozzle provided to the torch body around the outer periphery of the solid wall, and a shield gas supply means provided to the torch body for jetting nonoxidative gas in said torch body so as to cover a part to be processed of the workpiece with the nonoxidative gas.

According to the present invention, there is provided an automatic underwater processing apparatus comprising an underwater processing apparatus in which a workpiece is locally covered with a shield member in an underwater environment while the shield member is filled therein with gas, and the shield member is covered with a water stream curtain jetted from a water jet nozzle provided around the outer periphery of the shield member while the workpiece is inspected or processed, a gas supply device which detects a pressure, a flowrate or the like of the gas fed from a gas bomb so as to supply the gas into the shield member under control of the supply volume of the gas, a water supply device for supplying water under control of water pressure or the like in accordance with a size of the welding bevel or the like, a water depth or the like, a drive device integrally incorporated with the underwater processing apparatus and is operated along an object to be inspected or processed, in accordance with inspection terms or manufacturing terms, and a control device for carrying out the above-mentioned inspection or process in accordance with a previously stored program or in follow-up to variation in the output thereof.

Further, according to the present invention, there is provided an underwater processing method in which a workpiece preferably having a welding bevel is locally covered, in an underwater environment, with a shield member which is filled therein with gas, preferably, inert gas, the outer periphery of the shield member is covered with a water stream curtain, and in this condition, the workpiece is inspected or process. It is preferable that the shield defined by the water stream curtain may not be provided for shielding the entire shield member, but be provided for shielding the welding bevel with a sufficient width in the direction of the processing or the inspection.

According to the present invention, there is provided a nuclear reactor composed of reactor interior components such as a shroud, a gas-water separator, a reactor core support panel, an upper grid panel, a shroud support, a control rod housing, and a control rod drive device housing, these components constituting the nuclear reactor are made of austenite group stainless steel, wherein at least one of these components is repaired through multi-layered buildup welding, and the area of the build-up welding is preferably from 0.1 to 5 mm$^2$, and more preferably from 0.5 to 3 mm$^2$, in section per one pass.

According to the present invention, there is provided a nuclear reactor repairing method of repairing at least one of the above-mentioned components constituting the nuclear reactor, wherein the component is locally covered in an underwater environment with a shield member which is filled therein gas, and the outer periphery of the shield member is covered with a water stream curtain while the above-mentioned multi-layered build-up welding is carried out with the use of a welding wire having a diameter of less than 1 mm, and preferably 0.4 to 0.8 mm, by a heat source preferably with 0.1 to 1.5 kJ/cm, and more preferably with 0.5 to 1 kJ/cm. Arc or a laser beam is used as a heat source. The arc for high frequency pulse welding of 1 to 20 kHz can carry out welding with a low input heat, and accordingly, repair welding with an extremely small heat affected zone (HAZ) can be made. The repair welding according to the present invention, can be carried out underwater, and accordingly, welding with substantially no HAZ can be carried out. Therefore, the welding after the repair can be directly used.

With the underwater processing apparatus according to the present invention, an arc is produced between a non-consumable electrode or a consumable electrode, which is located in the vicinity of a welding position, and a mother material by a main pulse current during build-up welding using high-frequency pulse arc welding, a reverse pulse current having a polarity different from that of the main pulse current is applied upon transient from the turn-on to the turn-off of the main pulse current, so as to the leading edge parts and the trailing edge parts of the main pulse and the reverse pulse are sharpened in order to form a directive arc, thereby it is possible to carry out welding with a low input heat.

It is preferable to prepare a current stopping period between the main pulse currents after the reverse current. It is preferable to apply a base current which is smaller than the main pulse current, between the main pulse currents after the reverse pulse current.

It is preferable to periodically change either the peak values of the main pulse current and the main base current or the energizing times of the main pulse current and the base current. It is preferable to periodically change the main pulse current with a period from several Hz to several ten Hz so as to agitate molten metal in order to inhibit grain growth.

It is preferable to change the main pulse current, the reverse pulse current and the base current, the energizing time and the current stopping time, independent from one another.

It is preferable to set the rise time and the fall time of the main pulse current to 50 $\mu$sec.

It is preferable to incorporate, in the above-mentioned welding device, a power source for supplying the main pulse current for generating an arc between the non-consumable electrode or the consumable electrode, which is located in the vicinity of the welding position, and the mother material, a high frequency converting device for converting a d.c. current into high-frequency welding currents having different polarities, and a control device for applying the reverse pulse current having a polarity different from that of the main pulse current upon transient from the turn-on to the turn-off of the main pulse current, so as to sharpen the leading edges and the trailing edges of the main pulse current and the reverse pulse current in order to form a directive arc.

According to the present invention, there is provided an underwater pulse arc welding device comprising a welding torch incorporating an arc electrode, a pulse welding power source for producing a high frequency pulse current which periodically generates a high frequency pulse arc voltage at the arc electrode, and a servomotor, a torch drive part for adjusting a gap between the arc electrode in the welding torch and a mother material to be welded, an arc voltage detecting part for detecting a voltage between the arc electrode and the motor material to be welded, and a turn-on time averaging device for obtaining an average value of arc voltages in a time period from the time of initiation of rising to the time of completion of falling of the pulse arc voltage, wherein the torch drive part is preferably operated for adjustment so that an averaged voltage value during the turn-on period, obtained by the turn-on time averaging part becomes equal to an arc voltage reference value.

Further, according to the present invention, it is preferable to provide a low pass filter circuit for processing a waveform of the above-mentioned arc voltage, in addition to the means having the above-mentioned feature so as to obtain an averaged value over a turn-on time after the above-mentioned waveform process is carried out.

Further features and advantages obtained by the present inventions will be apparent from the following description in which preferred embodiments detailed with reference to the drawing in which:

BRIEF DESCRIPTION OF SEVERAL VIEWS

DESCRIPTION OF PREFERRED
EMBODIMENTS OF THE INVENTION

Embodiment 1

Figure 1:
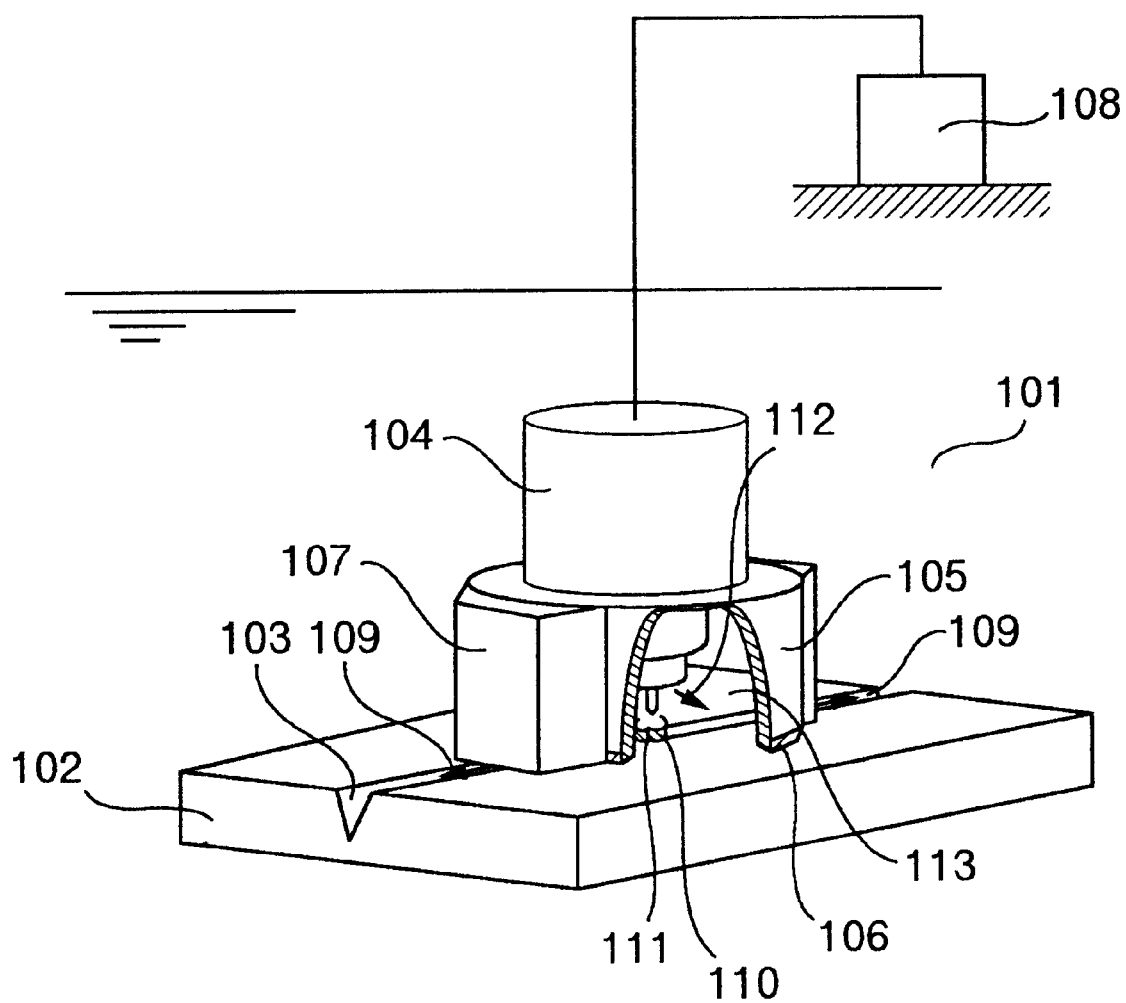
FIG. 1 is a perspective view illustrating an underwater processing apparatus according to the present invention.

Referring to FIG. 1 which is a perspective view illustrating an underwater processing apparatus in an embodiment of the present invention, in this embodiment, the underwater processing apparatus 101 is an underwater TIG welding apparatus for welding a welding bevel 103 of a workpiece 102 as a member to be welded in an underwater environment. A TIG welding power source 108 is located outside of the underwater environment, and only the part of a welding torch 104 for generating a welding arc 11 is located underwater. In this arrangement, the welding torch 104 and a part 110 to be welded are surrounded by a partition wall 105 in order to be prevented from making contact with water, and argon gas as shield gas 112 is introduced into the inside of the partition wall 105 at a high velocity under a high pressure so as to define a water displacement space 113 (the welding part 110 is a space shielded with gas) from which water is locally displaced. The partition wall 105 is opened in parts which are opposed to the welding bevel 103 of the workpiece 102, and the partition wall 105 has a shape which is set so as to cover the welding bevel 103 over its entire width and covers a flat part of the workpiece 102. Further, a solid wall is provided in a skirt part where the partition wall 105 makes contact with the workpiece 102. Further, water nozzles 107 are provided in both left and right sides of the partition wall 105, and accordingly, water is jetted to the welding bevel 103 at a high speed and at a high pressure so as to create water walls 109 in the form of water curtains in order to displace water from the welding bevel 103.

A solid wall 106 is formed of a felt-like fabric woven from, self-lubricating, stretchable and flexible fibers having a thickness of about 5 mm.

Figure 2A:
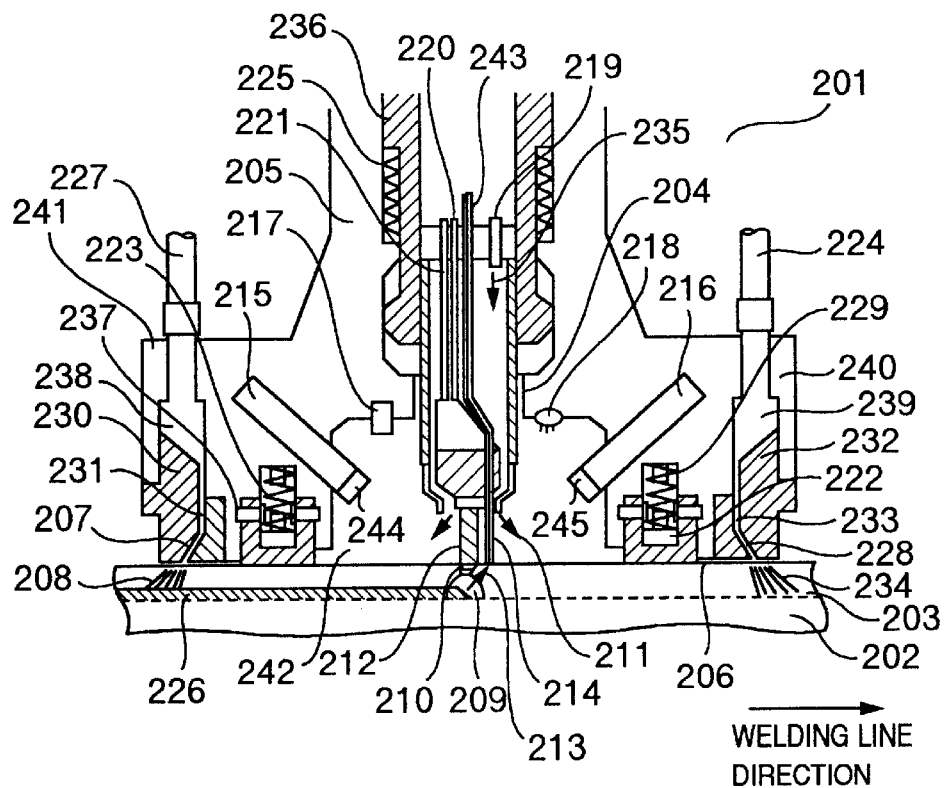
FIG. 2a is a sectional view illustrating the underwater processing apparatus according to the present invention.

FIG. 2(*a*) is a sectional view illustrating, in detail, the underwater processing apparatus shown in FIG. 1, and FIG. 2(*b*) is a view illustrating a part of the underwater processing apparatus 201, which makes contact with the workpiece 202, as viewed from the workpiece 202.

The under water processing apparatus 201 in the embodiment shown in FIG. 2(*a*) is an underwater TIG welding apparatus for welding the welding bevel 20s of the workpiece 202 which is a member to be welded in an underwater environment.

The welding torch 204 is located in the water displacement space 242 inside of the partition wall 205 made of aluminum group alloy so as to be prevented from making contact with water, and is made into contact with and secured to a welding torch fixing member 236. The partition wall 205 is opened in parts which are opposed to the welding bevel 203 of the workpiece 202, and the solid wall 206 is provided in the skirt part where the partition wall 205 makes contact with the workpiece 202. The welding torch fixing member 236 is provided so as to be slidable along the partition wall 205. Further, the welding torch fixing member 236 is provided with a welding torch spring 255. The welding torch 204 is connected to the welding torch moving mechanism (which is not shown), being communicated with the welding torch fixing member 236 so that the welding torch can be moved up and down in order to move to and away from the welding bevel 203 of the workpiece 202 in the direction opposed to the latter, independent from the partition wall 205. Further, the welding torch is urged by the resilient force of the welding torch spring 225 in a direction away from the welding bevel 203 of the workpiece 202.

An electrode 212 is provided at the front end of the welding torch 204, which is opposed to the welding bevel 203 of the workpiece 202, and a filler wire 213 is fed into the welding torch 204, coaxial with the latter, from a wire reel (which is not shown) through the inside of a wire guide 243, and is extended through the inside of a wire tip 214 in order to be located in the vicinity of the electrode 212. As shown in the figure, the filler wire 213 is fed in the welding line direction which is in the build-up welding direction of the welding bevel 203.

The filler wire 213 is fed, coaxial with the welding torch 204, and accordingly, the wire tip 214 is set at a slight angle so that the leading end of the filler wire 213 is held so as to be spaced from the electrode 212 by a predetermined distance.

The welding torch 204 is formed therein with a shield gas inlet port 219 through which argon gas in the form of shield gas is fed toward the electrode 212 from a shield gas supply part (which is not shown) through the welding torch 204, and is jetted as shield gas from the outer periphery of the electrode 212 in order to protect an welding arc 212 produced from the electrode 212 and the welding part 209 from the external environment. Further, cooling water 220 and a power source line 221 are introduced into the welding torch which is therefore communicated with a cooling water source (which is not shown) and a welding power source (which is not shown).

Optical monitoring devices 215, 216 are provided in the water displacement space 242 inside of the partition wall 205 formed of the felt-like fabric. The optical monitoring device 215 is a means for monitoring the electrode, the leading end of the filler wire 213, the build-up welding 226, the welding arc 210 and the like. A light shield filter 244 is located in front of the optical monitoring device 215. A light shield filter opening and closing mechanism (which is not shown) is provided so that when the welding arc 210 is produced from the electrode 212 during welding, the light shield filter 244 covers the monitoring device 215 in front thereof in order to monitor the electrode 212, the leading end of the filler wire 213, and the like during welding, but when the welding is not carried out, the light shield filter 244 is shifted from a position in front of the optical monitoring device 215 in order to monitor the electrode 212, the leading end of the filler wire 213, the build-up welding 226 and the like. The optical monitoring device 216 is a means for monitoring the leading end of the filler wired 213, the welding arc 210, the welding part and the like. Similar to the optical monitoring device 215, a light shield filter 245 is located in front of the optical monitoring device 216, and is operated, similar to the light shield filter 244. Optical image data obtained from the optical monitoring devices 215, 216 are transmitted to an image receiving part (which is not shown) which is provided outside of the underwater environment.

A small-sized CCD camera of a solid image tube type is used as each of the optical monitoring devices 215, 216. An illumination device 218 is provided in the water displacement space 242 inside of the partition wall 205. In order to obtain a degree of brightness with which desired monitoring is possible through the optical monitoring devices 215, 216, the illumination device 218 illuminates the interior of the water displacement space 242 surrounded by the partition wall 205. With the illumination by this illumination device 212, the electrode 212 in the welding torch, the welding bevel 203 and the filter wire 213 can be precisely set at desired positions before the welding is started. In particular, A start position at which the welding is started is important. A pressure sensor 217 which is located in the water displacement space 242 inside of the partition wall 205, measures a pressure in the water displacement space 242, and transmits data of measured pressure to a pressure monitor (which is not shown). By detecting the pressure in the welding torch 204, the pressure can be held at a desired value, and accordingly, the welding can be satisfactorily made. Further, through the detection of the applied pressure, the pressures and volumes of water from water supply ports 225, 227 can be set to desired values in order to carry out the welding uniformly throughout.

Further, local leakage of gas can be detected by measuring a variation in the pressure, and accordingly, it can be known whether water enters the inside of the torch or not. Thus, it is possible to prevent water from entering the torch, thereby it is possible to carry out an underwater process with a high degree of reliability. The solid wall 206 is provided in the skirt part where the partition wall 205 makes contact with the workpiece 202. The solid wall 206 is secured to a solid wall retaining ring 222 having a doughnut-like disc shape, which is in turn secured to the partition wall 205 by means of solid wall springs 223. Further, the solid wall 206 is fixed to the partition wall 205 by solid wall retaining pins 237. The solid wall 206 is adapted to make always contact with the workpiece 202 by the resilient force of the solid wall springs 223. The solid wall 206 is arranged to cover the welding bevel 203 in its entirety in the widthwise direction thereof.

That is, even though the distance between the solid wall 206 and the workpiece 202 varies due to recesses and protrusions of the workpiece 202 as the welding torch 204 is moved, the pressure of the shield gas can be controlled while the distance thereberween is maintained at a predetermined value.

Water nozzles 240, 241 are arranged on the left and right sides of the partition wall 205. The water nozzles 240, 241 are connected thereto with the water supply ports 224, 227 which are in turn connected to a water pump (which is not shown). Further, water curtain outer peripheral members 230, 232, and water curtain inner peripheral members 231, 233 are provided in a direction opposed to the workpiece 202. Further, the combination of the water curtain outer peripheral members 230, 232 and the water curtain inner peripheral members 231, 233 causes the water jet ports 207, 228 to be opposed to the workpiece 202, and be opposed to the welding bevel 203. Further, in the arrangement composed of the water curtain outer peripheral members 230, 232 and the water curtain inner peripheral members 231, 233, water sumps 238, 239 are provided in the water nozzles 240, 241. The water sumps 238, 239 are communicated with the water jet ports 207, 208. The water fed from the water jet ports 207, 208 are led through the water sumps 238, 239 and through the water curtain outer peripheral embers 230, 232 and the water curtain inner peripheral embers 231, 233, and is then jetted from the water jet ports 207, 208 so as to create the water curtains 208, 234. The water jet ports 207, 228 are longer than the welding bevel 203 in the widthwise direction, that is, they covers the welding bevel 203 in its entirety in the widthwise direction.

The water jet ports 207, 208 are defined by the water curtain outer peripheral members 230, 232 and the water curtain inner peripheral members 231, 233 so as to have a rectangular shape.

The water curtain outer peripheral members 230, 232 and the water curtain inner peripheral members 231, 233 are made of aluminum based metal alloy or brass.

Explanation will be hereinbelow made of the underwater processing apparatus 201 constructed as mentioned above.

In the underwater processing apparatus 201, the shield gas 211 is jetted in order to define the water displacement space 242 outside of the underwater environment before introduction of the underwater processing apparatus into water, and water is jetted from the water jet ports 207, 228 so as to create the water curtains 208, 234. That is, the shield gas 235 is introduced into the welding torch 204 from the shield gas supply part (which is not shown) through the shield gas introduction port 219, and then the shield gas 211 is jetted from the outer periphery of the electrode 212 at a predetermined flow rate and at a predetermined flow speed. Further, water is fed from the water supply ports 224, 227 provided in the water nozzles 240, 241 by means of the water pump (which is not shown) at a predetermined flow rate and at a predetermined flow speed so as to create the water curtains 208, 234.

The underwater processing apparatus 201 having been set in the above-mentioned condition is introduced in the underwater environment, and is then allowed to approach a desired position, that is, the position of the welding part 209 for the welding bevel 203 of the workpiece 202 which is a member to be welded existing in the underwater environment. Thus, the shield gas 211 has been previously jetted and the water curtains 208, 234 have been created outside of the underwater environment. In order to prevent water from entering the water displacement space 242, the shield gas 211 and the water are fed preferably at desired flow rates and flow speeds during movement underwater.

The underwater processing apparatus 201 introduced underwater is allowed to approach the workpiece 202 so that the solid wall 206 provided in the partition wall 205 of the underwater processing apparatus 201 covers the welding bevel 203 of the workpiece 202 in the widthwise direction. At this stage, water in the welding bevel 203 is started to be discharged outside from a part on the workpiece 202 by the shield gas 211, which is defined by a projection of the partition wall 205, by the shield gas 211 and the water curtains 208, 234, and further, water on a flat part of the workpiece 202 is also started to be discharge outside from the part on the workpiece 202, which is defined by the projection of the solid wall 205, by the shield gas 211, so as to start the formation of the water displacement space 242. At this stage, it is preferable to completely form the water displacement space 242 above the workpiece 202 before the solid wall comes into close contact with the flat part of the workpiece 202.

When the solid wall 206 makes contact with the workpiece 202, the solid wall 206 and the solid wall retaining ring 222 are pushed back in a direction perpendicular to the workpiece 202 so as to contract the solid wall springs 223, and accordingly, the solid wall 206 is pressed against the flat part of the workpiece 202 through the intermediary of the solid wall retaining ring 222 by the resilient forces of the solid wall springs 223 so that the solid wall 206 is made into always contact with the flat part of the workpiece 202. Since the solid wall 206 is formed of the felt-like fabric woven with carbon fibers, the solid wall 106 itself has elasticity so as to be preferable.

When the solid wall 206 makes contact with the workpiece 202, the shield gas 211 is discharged into water in the form of bubbles, through the gap between the solid wall 205 and the workpiece 202, and since the solid wall 206 is formed of the felt-like fabric woven with carbon fibers, the shield gas 211 also discharged into water through the felt-like fabric, in the form of air bubbles.

An this stage, it is preferable to control the flow rate and flow speed of the shield gas 211 with the use of the pressure sensor 217 provided in the water displacement space 242 in order to set the pressure in the water displacement space 242 to be higher than the water pressure around the underwater processing apparatus 201. With this arrangement, water outside of the partition wall 205 is prevented from entering the water displacement space 242, but is discharged into the outside of the partition wall 205 where the pressure is lower than that in the water displacement space 242, thereby it is possible to stably form the water displacement space 242.

When the solid wall 206 makes contact with the workpiece 202, since the shield gas 211 is discharged outside of the partition wall 205 through the partition wall 205 in the form of air bubbles, water outside of the underwater processing apparatus 201 is prevented from entering the water displacement space 242 through the welding bevel 203. Further, the water curtains 208, 234 formed by water jetted from the water jet ports 207, 228 serve as a barrier which prevents water outside of the underwater processing apparatus 201 from entering the water displacement space 242 through the welding bevel 203. At this stage, it is preferable to control the flow rate and flow speed of the shield gas 211 to desired values in order that the water curtains 208, 234 are gradually widened outward in an inverted V-like shape, thereby it is possible to prevent the water curtains 208, 234 from being formed inside of the water displacement space 242.

At this stage, although the water fed into the water supply port 224, 227 formed in the water nozzles 240, 227 from the water pump (which is not shown) is jetted from the water jet ports 207, 228 at a desired flow rate and a desired flow speed so as to form the water curtains 208, 234, it is also possible to set the flow rate and the flow speed of the water led into the water supply ports 224, 227 so as to form the water curtains 208, 234 respectively having different shapes.

The electrode 212 is slightly moved in a desired welding part 209 under control based upon image data obtained from the optical monitoring device 215. The image data is transmitted to the image receiving part (which is not shown) provided outside of the underwater environment, and the underwater processing apparatus 201 is displaced so that the electrode 212 takes a position vertically above the desired welding part 209 on the welding bevel 203 of the workpiece 202 under remote-control through manipulation by a worker or through automation operation in response to the image data on the image receiving part. At this stage, the light shield filters 244, 245 provided in front of the optical monitoring devices 215, 216 are shifted from positions in front of the optically monitoring devices 215, 216 by means of the light shield filter opening and closing mechanisms (which are not shown). At this stage, the illumination device 218 provided in the water displacement space 242 inside of the partition wall 205 illuminates the interior of the water displacement space 242 surrounded by the partition wall 205 with brightness by which desired monitoring can be made by means of the optical monitoring devices 215, 216.

When the solid wall 206 makes contact with the workpiece 202 so as to completely form the water displacement space 242 including the welding bevel 203, the electrode 212 provided in the welding torch 204 approaches in order to take a position which is located by a desired vertical distance from the desired welding part 209 on the welding bevel 203 of the workpiece 202 so as to make preparation for starting welding. At this stage, the welding torch 204 is communicated with the welding torch fixing part 236 and connected to the welding torch moving mechanism (which is not shown), and accordingly, the electrode 212 approaches so as to take a position which is located by a desired vertical distance from the desired welding part 209 through the operation of the welding torch moving mechanism (which is not shown). Accordingly, since the welding torch 204 is moved through the intermediary of the welding torch fixing member 236, independent from the partition wall 20, the partition wall 205 always has a fixed positional relationship with the workpiece 202. Thus, the solid wall 206 provided in the partition wall 205 is always makes contact with the workpiece 202, and accordingly, it is possible to prevent water around the partition wall 205 from entering the water displacement space 242.

Starting of welding for the desired welding part 209 is set up through touch start such that the electrode 212 makes contact with the welding part 209, and then separates therefrom at once. This operation is carried out by the welding torch moving mechanism (which is not shown), the separation of the electrode 212 from the welding part 209 is made at a high speed with the aid of the resilient force of the welding torch spring 225.

The distance by which the electrode 212 is separated from the welding part 209 becomes equal to the length of the welding arc 210. This length of the welding ark is determined in dependence upon a desired welding voltage, a desired welding current, a desired input heat, and a desired build-up degree.

An arc 230 is produced from the electrode 212 so as to start welding, and then the welding torch 204 incorporating the electrode 212 is moved along the direction of a welding line (indicated by the allow) in the lengthwise bevel direction of the welding bevel 203 of the workpiece 202 while the filler wire 213 is fed to the electrode 212 at a desired speed in order to carry out the build-up welding of the bevel. At this stage, the welding torch 204 communicated with the welding torch fixing member 236 is moved simultaneously with the movement of the partition wall 205 so as to carry out the welding. The traveling speed of the welding torch 204 which is moved in the direction of the welding line simultaneously with the movement of the partition wall 205, that is, the welding speed is determined in dependence upon a desired degree of the build-up welding 226. Further, the degree of the build-up welding 226 is determined by a speed with which the filler wire 213 is fed.

Before staring the welding for the desired welding part 209, the light shield filters 244, 245 located in front of the optical monitoring devices 215, 216 are controlled by the light shield filter opening and closing mechanisms (which are not shown) so as to cover the optical monitoring devices 215, 216 in front of the latter. The optical monitoring devices 215, 216 carries out, through the light shield filters 244, 245, the monitoring of a length of the welding arc 210, the monitoring of a degree of supply of the filler wire 213 to the electrode 212, a shape of a build-up formed by the build-up welding upon a touch start at which the electrode 212 makes contact with the desired welding part 209, and then separates therefrom at once, and during the build-up welding during which the welding torch 204 incorporating the electrode 212 is moved. The optical image data thus obtained is transmitted to the image receiving part (not shown) provided outside of the underwater environment. A desired welding voltage, a desired welding current, a desired input heat value, a desired degree of build-up welding, a desired travel speed of the welding torch or the welding speed, and a desired feed speed of the filler wire 213 are remote-controlled in accordance with the thus obtained optical image data through manipulation by a worker or through automatic operation.

When the welding torch 204 and the partition wall 205 are simultaneously moved along the welding line in the lengthwise direction of the welding bevel 203 of the workpiece 202 (the direction of the arrow shown in the figure), the solid wall 206 provided in the partition wall 205 is moved while it slides on the flat part of the workpiece 202. During this movement, the solid wall 205 slides on the workpiece while it is pressed against the workpiece 202 by the resilient force of the solid wall springs 223 through the intermediary of the solid wall retaining ring 22. Even though slight ruggedness is present in the workpiece 202, the solid wall 206 can follow the surface ruggedness of the workpiece 202 due to the resilient force of the solid wall spring 223 and the flexibility of the solid wall 206 itself which is formed of the felt-like fabric woven with carbon fibers, and accordingly, it is always stably made into contact with the workpiece 202, thereby it is possible to prevent water outside of the partition wall 205 from entering the water displacement space 242. Further, the water curtains 208, 234 formed in the welding bevel 203 can also prevent water from entering the water displacement space 242 through the welding bevel 203 even though the welding torch 204 and the partition wall 205 are moved simultaneously along the welding line in the lengthwise direction of the welding bevel 203 of the workpiece 202 (the direction indicated by the arrow shown in the figure).

In such a case that the build-up welding for the welding bevel 203 is carried out in order to fill the welding bevel 203 up to a height equal to or higher than that of the flat part of the workpiece 202, if the volume of the build-up welding 226 is small with respect the depth and the width of the welding bevel 203 so that the welding bevel 203 cannot be filled at one time of the welding, it is required that the build-up welding is repeated several times so as to stack build-up welding layers 226 one up another in order to fill the welding bevel 203. Explanation will be made of the operation in this case with reference to FIGS. 3(a), and 3(b).

Figure 2B:
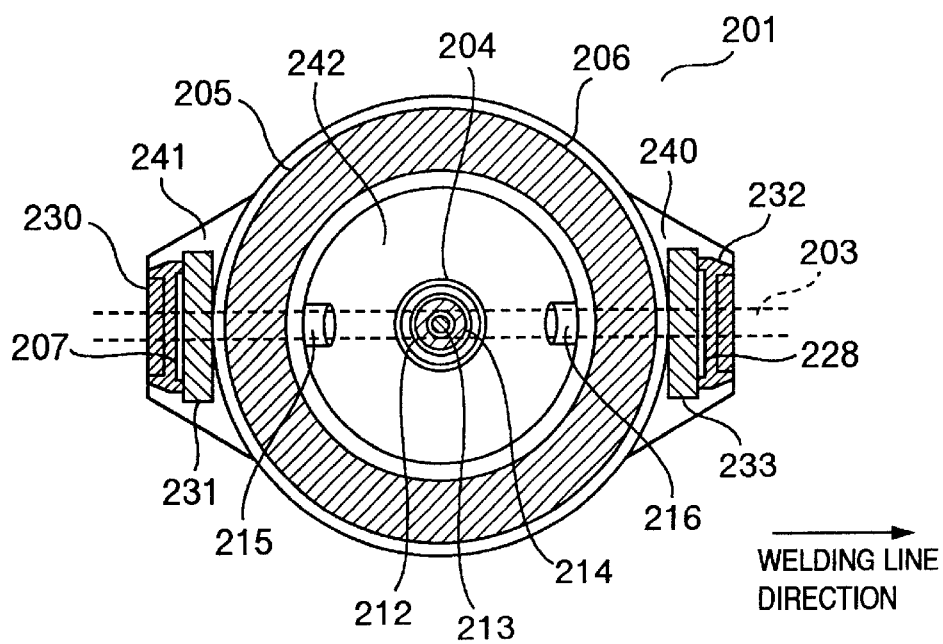
FIG. 2b is a bottom view illustrating the underwater processing apparatus according to the present invention.
Figure 3A:
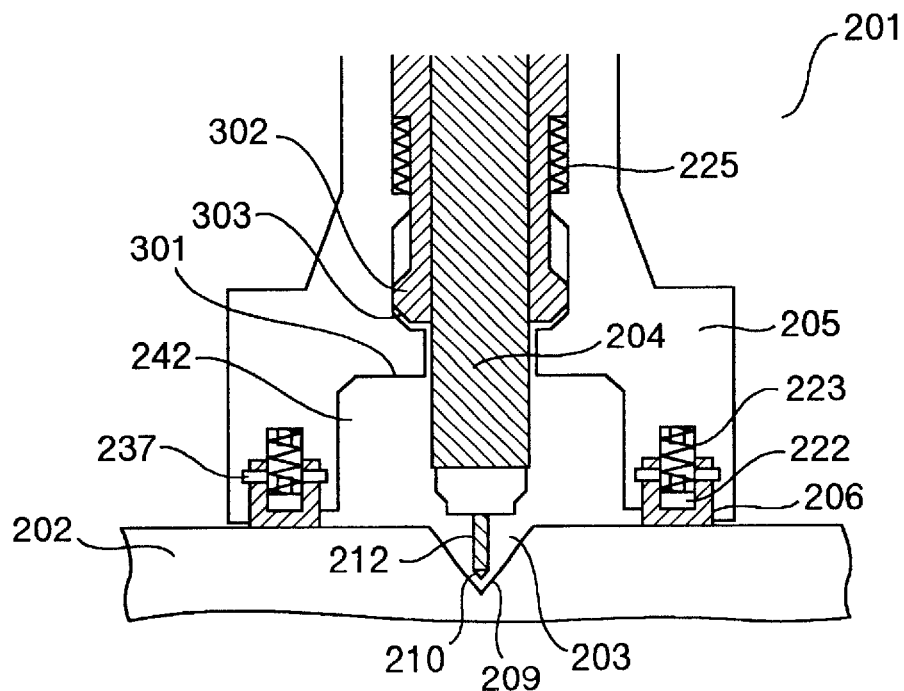
FIG. 3a is a sectional view illustrating the underwater processing apparatus according to the present invention.
Figure 3B:
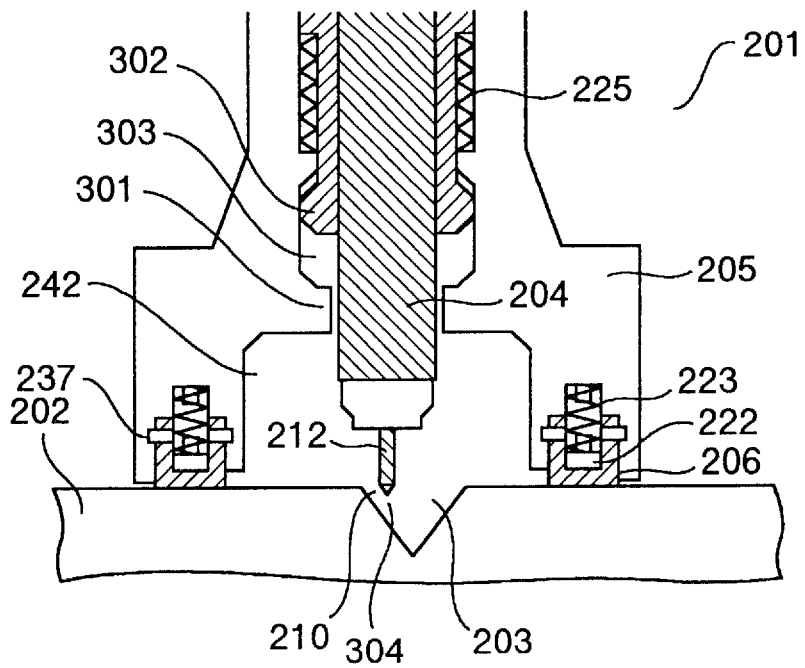
FIG. 3b is a sectional view illustrating the underwater processing apparatus according to the present invention.

FIG. 3(a) and FIG. 3(b) are longitudinally sectional views illustrating the underwater processing apparatus 201 shown in FIG. 2, as viewed in the longitudinal direction of the welding bevel 203.

As shown in FIG. 3(a), the partition wall 205 is moved up to a desired position in the desired welding part 209 in the welding bevel 203 of the workpiece 202 along the welding line in the lengthwise direction of the welding bevel 203, and accordingly, the welding torch 204 fixed to the partition wall 205, and the electrode 212 are moved while the build-up welding is carried out so as to form the welded build-up 226. It is noted that the direction of the welding line in the lengthwise direction of the welding bevel 200 of the workpiece 202 is perpendicular to the plane of the surface of FIG. 3(a).

In order to set the length of the welding arc 210 to a desired value, a desired welding voltage, a desired welding current, a desired input heat value, a desired build-up degree, a desired travel speed of the welding torch 204 or the welding speed, a desired feed speed of the filler wire 213 and the like are remote-controlled through manipulation by a worker or through automatic operation in accordance with optical image data transmitted to the image receiving part (which is not shown) located outside of the underwater environment, from the optical monitoring devices 215, 216, preferably from the optical monitoring device 215. The desired control is similar to that mentioned above.

If the welding bevel 203 cannot be completely filled with the welded built-up formed by the above-mentioned welding, the welding is repeated by more than two times so as to form more than two welded build-up layers 226 are formed, that is, the build-up welding for multi-layers is carried out.

In the case of forming more than two welded build-up layers, it is required to move the electrode 212 to a welding part 304 next to the desired position, this movement is carried out as follows: That is, as shown FIG. 3(b), it is carried out in accordance with an image date obtained by the optical monitoring devices 215, 216. The image data is transmitted to the image receiving part (which is not shown) located outside of the underwater environment, and then, the underwater processing apparatus 201 is moved under remote control though the manipulation by a worker or through automatic operation in accordance with the image data on the image receiving part (which is not shown) so as to locate the electrode 212 vertically above the desired next welding part 304 in the welding bevel 203 of the workpiece 202. At this stage, the light shield filters 244, 245 located in front of the optical monitoring devices 215, 216 are shifted from positions in front of the optical monitoring devices 215, 216 by means of the shield filter opening and closing mechanisms (which is not shown).

In comparison with the vertical positions of the electrode 212, the welding torch 204, the welding torch fixing member 236, with respect to the welding part 209, which are shown in FIG. 3(a), those shown in FIG. 3(b) are separated by longer distances from the welding part 209. Accordingly, a gap 303 defined between the welding torch retaining part 302 and the welding torch 204 becomes wider. Further, the welding torch spring 225 is compressed by a large degree as shown in FIG. 3(a) in comparison with that shown in FIG. 3(b).

Further, the next desired wielding part 304 shown FIG. 3(b) is displaced by a desired distance in the widthwise direction of the welding bevel 203 from the desired welding part 209 shown in FIG. 3(a), and accordingly, it is required to also displace the position of the electrode 212 which is located vertically above the welding part 209, by the desired distance in the widthwise direction of the welding bevel 203. The movement of the electrode 212 along the welding line in the lengthwise direction of the welding bevel 203 or the widthwise direction of the welding bevel 203, is equal to that of the partition wall 205 and the underwater processing apparatus 201 through the welding torch 204 and the welding torch fixing member 236, and accordingly, the degree of movement of the electrode 212 is equal to that of the partition wall 205 and the underwater processing apparatus 201.

Even during the desired movement of the electrode 212 in the widthwise direction of the welding bevel 203, the water curtains 208, 234 are formed in the welding bevel 203 since the water jet ports 207, 228 have such a shape that they cover the welding bevel 203 over the entire widthwise of the latter, and accordingly, it is possible to prevent outside of the underwater processing apparatus 201 from entering the water displacement space 242 through the welding bevel 203. In order to prevent the water curtains 208, 234 from being formed in the water displacement space 242, it is preferable that the flow rate and flow speed of the shield gas 211 is controlled to desired values, so as to form always the water curtains 208, 234 in a shape which is widened outward, that is, in an inverted V-like shape.

By moving the partition wall 205 to a desired position in the next desired welding part 304 in the welding bevel 203 of the workpiece 202 along the welding line in the lengthwise direction of the welding bevel 203, the welding torch 204 fixed to the partition wall 205, and the electrode 212 are moved while the bevel welding for the welding bevel 203 is carried out so as to form the welded build-up 226. It is noted that the welding line in the lengthwise direction of the welding bevel 203 is perpendicular to the plane of the surface of FIG., 3(b).

With the repetitions of the above-mentioned steps, the build-up welding for the welding bevel 203 is carried out by several times so as to stack the welded build-up layers in order to fill the welding bevel 203.

Next, explanation will be made of variants forms of the water nozzles with reference to FIGS. 4(a) to 4(e).

FIGS. 4(a) to 4(e) show various shapes of water nozzles 440 which can be seen as the underwater processing apparatus 201 is viewed from the workpiece 202, instead of FIG. 2(b).

Figure 4A:
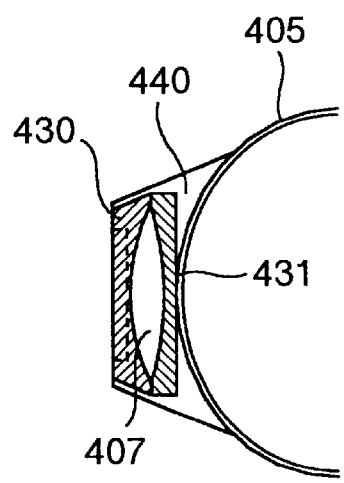
FIGS. 4a to 4e are partial views illustrating the lower surface of water nozzles according to the present invention.

In FIG. 4(a), a water jet port 407 defined by a water curtain outer peripheral member 430 and a water curtain inner peripheral member 431 has an elliptic shape. Accordingly, the shape of projection of the water curtains 208, 234 formed toward the welding bevel 203 of the workpiece 202 becomes an elliptic shape on the welding bevel 203.

Figure 4B:
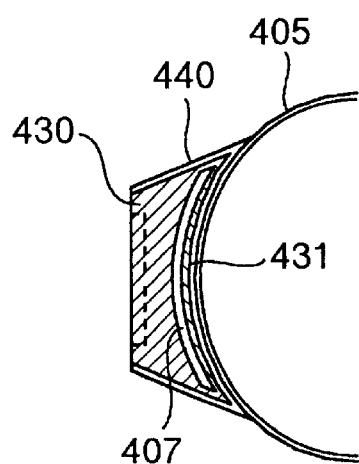

In FIG. 4(b), a water jet port 407 defined by a water curtain outer peripheral member 430 and a water curtain inner peripheral member 431 has a crescent shape so that it is bulged in a direction reverse to the direction opposed to the partition wall 15. Accordingly, the shape of projection the water curtains 208, 234 formed toward the welding bevel 203 of the workpiece 202 becomes a crescent shape, being projected toward the welding bevel 203 on the welding bevel 203.

Figure 4C:
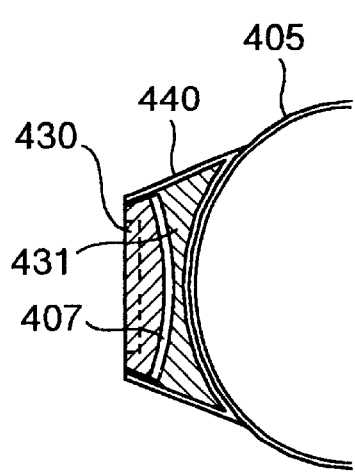

In FIG. 4(c), a water jet port 407 defined by the water curtain outer peripheral member 430 and a water curtain inner peripheral member 431 has a crescent shape so that it is bulged in a direction opposed to the partition wall 15. Accordingly, the shape of projection of the water curtains 208, 234 formed toward the welding bevel 203 of the workpiece 202 have a crescent shape, on the welding bevel 203.

Figure 4D:
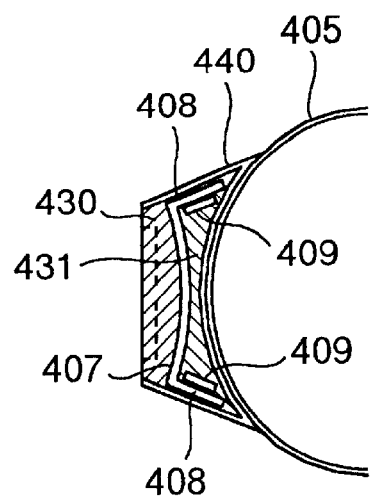

In FIG. 4(d), a water jet port 407 defined by a water curtain outer peripheral member 430 and a water curtain inner peripheral member 431 has a crescent shape so that it is bulged in a direction opposed to the partition wall 15. Further, both end parts of the water jet port 407 are connected thereto with second water jet ports 408. Further, gas jet ports 409 are provided in he vicinity of the second water jet ports 407. Further, the second water jet ports 408 may not be connected to the water jet ports 407 if it is adjacent to the latter.

In this arrangement, the water curtains 208, 234 jetted from the second water jet port 408 is widened outward, being opposed to the welding bevel 203.

Figure 4E:
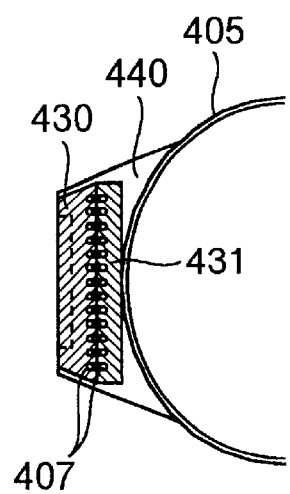

In FIG. 4(e), a water jet port 407 defined by a water curtain outer peripheral member 430 and a water curtain inner peripheral member 431 is formed of several small diameter bores.

Embodiment 2

Figure 5:
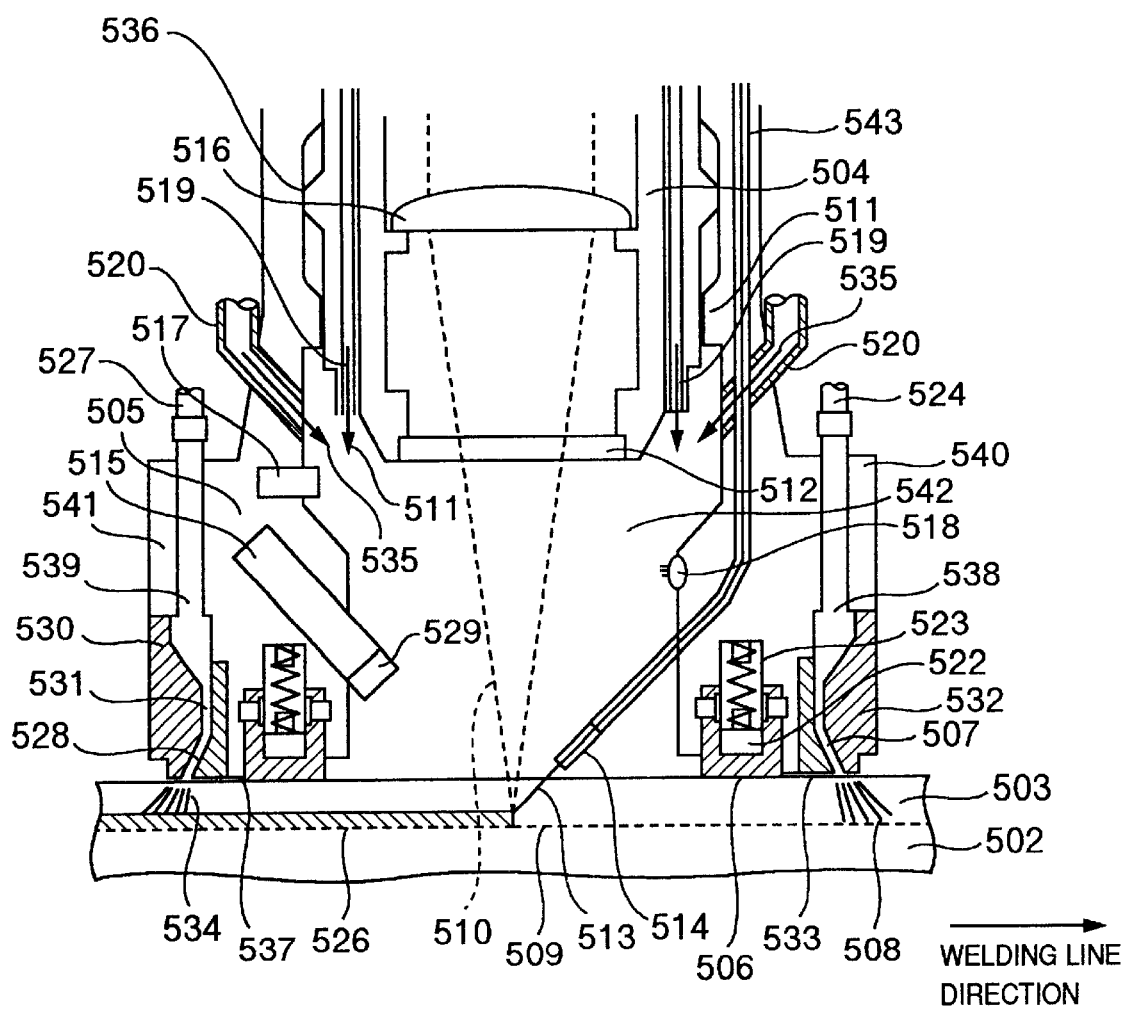
FIG. 5 is a sectional view illustrating an underwater laser processing apparatus according to the present invention.

FIG. 5 is a longitudinal sectional view illustrating an underwater laser welding apparatus 501 in an embodiment of the present invention.

The underwater laser welding apparatus 501 is adapted to weld a welding bevel 503 of a workpiece 502 which is a member to be welded located in an underwater environment.

A laser torch 504 incorporated therein with a condenser lens 516 and at its front end with a protecting glass pane 512 is located in a water displacement space 542 inside of a partition wall 505 so as to be prevented from making contact with water, and is made into contact with and secured to a laser torch fixing member 536. The partition wall 505 is opened in parts opposed to the welding bevel 503 of the workpiece 502, and a solid wall 506 made of aluminum based alloy is provided in a skirt part in which the partition wall 505 makes contact with the workpiece 502. The laser torch fixing member 536 is located so as to be slidable along the partition wall 505. The laser torch 504 is communicated with the laser torch member 536 and is connected to a laser torch moving mechanism (which is not shown), and the laser torch 504 can be vertically moved to and from the welding bevel 503 of the workpiece 502, independent from the partition wall 505.

Further, a filler wire 513 is fed from a wire reel (which is not shown) through a wire guide 543, and is located in the vicinity of a welding part 509 through a wire tip 514 provided at the leading end of the filler wire 513. As shown, the filler wire 513 is fed in the direction of the welding line, that is, the direction of build-up welding in the welding bevel 503. Shield gas jet ports 519, 520 are provided in the vicinity of the protecting glass pane 512 provided to the laser torch 504. Argon gas in the form of shield gas 511, 512 is fed from a shield gas supply part (which is not shown), and is then jetted so that a laser beam 510 emitted from the laser torch 504, the welding part 509, and the protecting glass 512 and the like are protected from an outside environment. Further, an optical fiber (which is not shown) is connected to the laser torch 504.

The shield gas jet ports 519, 520 are provided in a plural number. Only either one of them may be provided.

An optical monitoring device 515 is provided in the water displacement space 512 inside of the partition wall 505. The optical monitoring device 515 using a solid image tube type small-sized CCD camera is a means for monitoring the leading end of the filler wire 513, a welded build-up 526, the welding part 509 and the like. A light shield filter 529 is provided in front of the optical monitoring device 515. A shield filter opening and closing mechanism (which is not shown) is provided so that when the leading end of the filler wire 513, the welding part 509 and the like are monitored during welding, the light shield filter 529 covers the optical monitoring device 515 in front of the latter, but the light shield filter 529 is shifted from a position in front of the optical monitoring device 515 when the welding is not carried out. Optical image data obtained by the optical monitoring device 515 is transmitted to an image receiving part (which is not shown) outside of the underwater environment.

An illumination device 518 is provided in the water displacement space 512 inside of the partition wall 505. The illumination device 518 illuminates the interior of the water displacement space 512 inside of the partition wall 505 with a brightness which desired monitoring can be made through the optical monitoring device 515.

A pressure sensor 517 is provided in the water displacement space 512 inside of the partition wall 505 so as to measure a pressure in the water displacement space 512, and data of the measured pressure is transmitted to a pressure monitor (which is not shown).

A solid wall 506 formed of a felt-like fabric, which is similar to that as mentioned above, is provided in a skirt part where the partition wall 505 makes contact with the workpiece 502. The solid wall 506 is secured to a doughnut-like disc shape solid wall retaining ring 522 which is in turn fixed to the partition wall 505 through the intermediary of solid wall springs 523. Further, the solid wall 506 is secured to the partition wall 505 by means of a solid wall retaining pin 537. The solid wall 506 is adapted to be always made into contact with the workpiece 502 by the resilient forces of the solid wall springs 523 through the intermediary of the solid wall retaining ring 522. The solid wall 506 covers the welding bevel 503 over the entire width thereof.

Water nozzles 540, 541 are provided on both left and right sides of the partition wall 505. Further, the water nozzles 540, 541 are connected thereto with water supply ports 524, 527 which are communicated to a water pump (which is not shown). Further, water curtain outer peripheral member 530, 532 and water curtain inner peripheral members 531, 533 are provided in a direction opposed to the workpiece 502. In the combination of the water curtain outer peripheral members 530, 532, and the water curtain inner peripheral members 531, 533, the water jet ports 507, 528 are opposed to the workpiece 502, and to the welding bevel 503. Further, with the arrangement composed of the water curtain outer peripheral members 530, 532, and the water curtain inner peripheral members 531, 533, water sumps 538, 536 are defined in the water nozzles 540, 541 which are communicated with the water jet ports 507, 508. Water led from the water supply ports 524, 517 flow through the water sumps 538, 539 and through the water curtain outer peripheral members 530, 532, and the water curtain inner peripheral members 531, 533, and is jetted from the water jet ports 507, 528 so as to form water curtains 508, 534. The water jet ports 507, 528 have a length which is larger than that of the width of the welding bevel 503 so as to cover the welding bevel 503 over its entire width.

Further, the shape of the water jet ports 540, 541 provided in the water nozzles 540, 541 similar to that explained in the second embodiment and the fourth embodiment.

In this embodiment, the water curtain outer peripheral members 530, 532, and the water curtain inner peripheral members 531, 533 are made of aluminum based metal alloy or brass.

The operation of the thus constructed underwater laser welding apparatus 501 shown in FIG. 5, that is, the introduction of the underwater laser welding apparatus 501 into the underwater environment, the water displacement operation and the movement of the underwater laser welding apparatus 501 required for multi-layered build-up welding and th e like are similar to those explained with reference to FIGS. 2 and 3.

Embodiment 3

Figure 6:
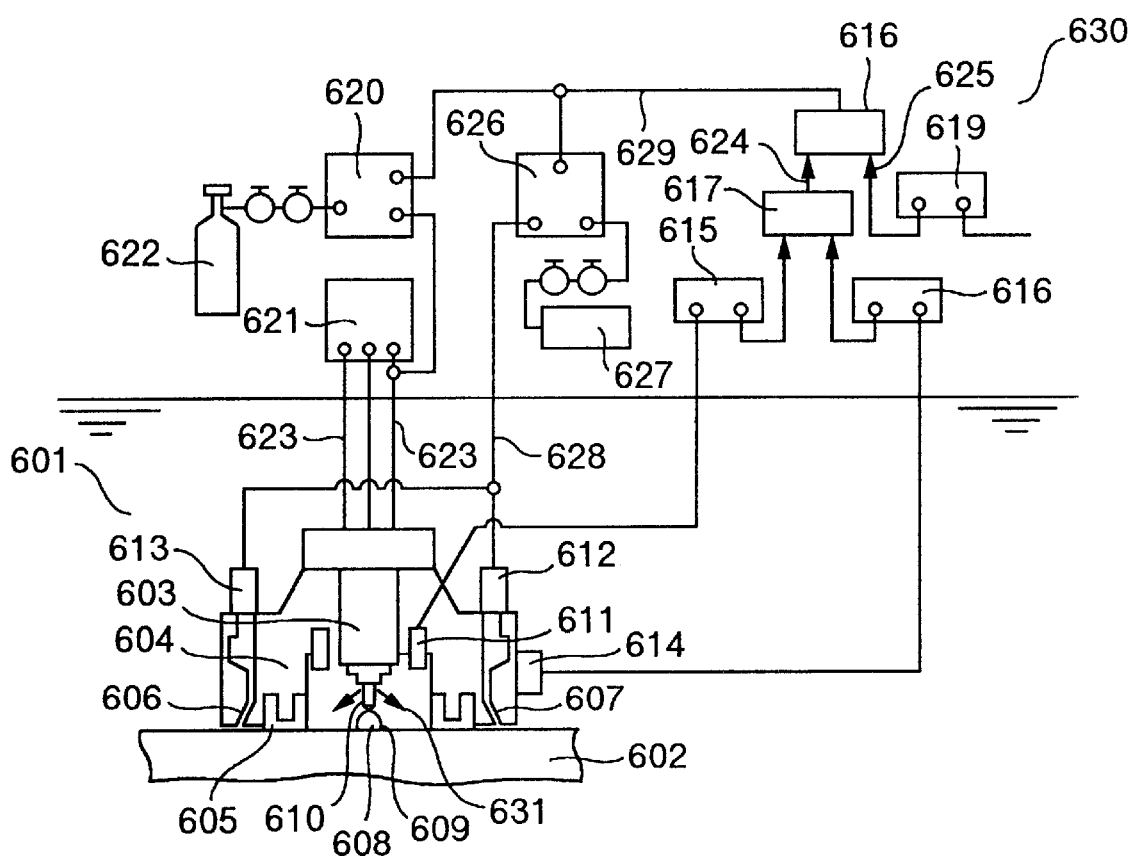
FIG. 6 is a view illustrating an entire arrangement of the underwater processing apparatus according to the present invention.

FIG. 6 shows a view illustrating an entire structure of a device for carrying out underwater welding with the use of the underwater processing apparatus 601 similar to that in the embodiment 1.

At first, explanation will be made of the underwater processing apparatus 604 having a water displacing means for preventing water outside of a welding part from entering. A partition wall 604 is provided around the outer periphery of a welding torch 603 incorporating an electrode 610 which produces a welding arc 609 for welding a desired welding part 608. This partition wall 604 incorporates a solid wall 605 in a skirt part which is made into contact with a workpiece 602, and is provided with water jet ports 606, 607 on the outside thereof while it has such a structure which is opened in a direction opposed to the workpiece 602. This welding torch 603 is connected to a welding power source 621 provided outside of an underwater environment. Further, a pressure sensor 611 is provided inside of the partition wall 604, and a water depth detector 614 is provided to the outside part of the partition wall 604.

During welding, it is preferable to control the flow rate and the flow speed of shield gas 631 under monitoring with the use of the pressure sensor 611 provided in the partition wall 604 so that the pressure inside of the partition wall 604 is higher than the pressure of water surrounding the underwater processing device 601. Accordingly, water outside of the partition wall 604 is prevented from entering the inside of the partition wall 604, and the shield gas 631 is jetted toward the outside of the partition wall 604 where the pressure is low. Thus, the water displacement can be stably carried out.

At first, an electric signal which is transmitted from the water depth detector 614 for detecting a water depth when the underwater processing apparatus 601 makes contact with the workpiece 602, to a pressure converter 616 provided in a pressure control part 630 located outside of the underwater environment so as to convert the electric signal into a water pressure signal in order to monitor the underwater processing apparatus 601. Further, the thus converted water pressure signal is delivered to a pressure comparator 617. Simultaneously, a pressure signal (which will be hereinbelow referred as "partition wall inside signal") delivered from the pressure sensor 612 provided to the partition wall 604 is a pressure monitor 615 provided in a pressure control part 630 located outside of the underwater environment so as to carry out monitoring. Then the partition wall inside pressure signal is delivered from the pressure monitor 615 to a pressure comparator 617. Thus, the pressure inside of the partition wall and the pressure outside thereof, that is, the partition wall inside pressure and the water pressure can be monitored by means of the pressure monitor 615 and the pressure converter 616. Further, it is possible to monitor such a fact that water is prevented from entering the inside of the partition wall 604 if the partition wall inside pressure is higher than the water pressure, and that water enters the inside of the partition wall 604 if the partition wall inside pressure is equal to or slightly lower than the water pressure, from the outside of the underwater environment.

Thus, if the pressure inside of the partition wall 604 is lowered, the flow rate of the shield gas 631 flowing into the inside of the partition wall 604 from a gas source 622 is increased in response to the pressure signal so as to increase the pressure inside of the partition wall 604, thereby it is possible to prevent water from entering the inside of the partition wall 604.

Meanwhile, a difference between pressure signals indicating the partition wall inside pressure and the water pressure is compared and amplified so as to a difference signal 642 is delivered. The difference signal 624 is compared with a reference signal 625 which is delivered from a reference signal generating part 619 and which is preset by means of the signal comparator 618, and the result of the comparison is delivered as a comparing signal 629.

A gas control device 620 receives this comparing signal 629, and controls the flow rate of the shield gas 631 fed from the gas source 622 in order to set the reference signal to be always greater than the preset reference signal. That is, the flow rate of the shield gas which is introduced into the inside of the partition wall 604 through a gas hose 623 is controlled so as to automatically control the pressure inside of the partition wall 604. With this method, the entrance of water into the inside of the partition wall 604 can be automatically prevented.

Further, the feed rate of water which is led into the water supply ports 612, 613 from a water source through a water hose 628, and which is jetted from the water jet ports 606, 607 so as to form water curtains is controlled. It is preferable for a water control device 626 to carry out control similar to that for the gas control device 620.

Embodiment 4

Figure 7:
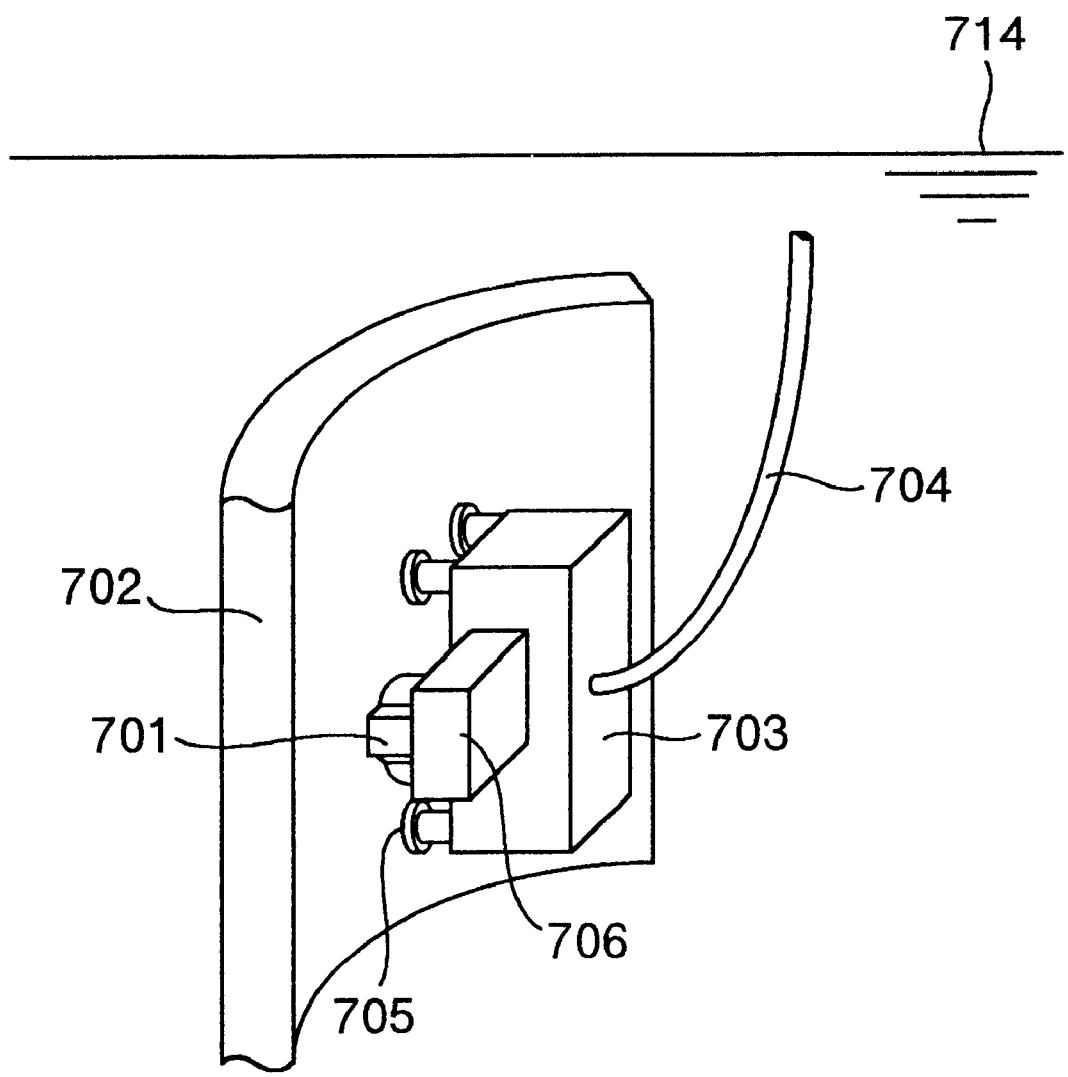
FIG. 7 is a perspective view illustrating an underwater working apparatus applied to a BWR plant shroud.
Figure 8:
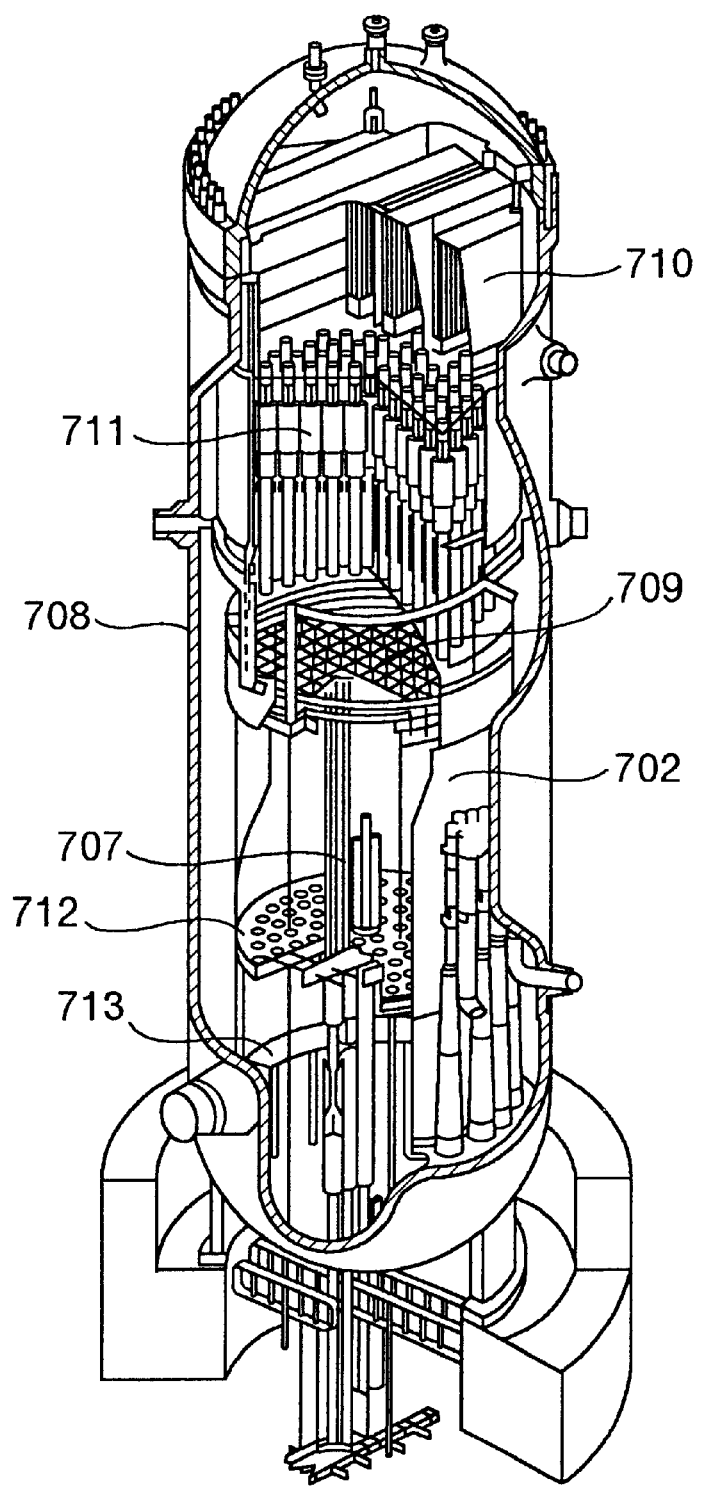
FIG. 8 is a perspective view illustrating a nuclear reactor.

FIG. 7 is a perspective view illustrating an underwater processing apparatus 703 for carrying out repair welding for a shroud 702 of a boiling water type nuclear power plant with the use of the device shown in FIG. 6, and FIG. 8 is a perspective view illustrating a nuclear reactor.

The core structure in the nuclear power plant is exposed to a large volume of radio-active rays. In particular, it is required to carry out a work in an underwater environment in which automatic remote control can be made in view of a safety for a worker in order to repair a structure such as a shroud 702, an upper grid plate 709 or a steam dryer 710 within a pressure container 708 which accommodates fuel rods 707.

AS to repair working, there may be considered underwater working such as check, inspection, fabrication, repair and surface reformation. Such underwater working is carried out as follows: That is, during a periodical inspection of the nuclear reactor, at first, a part which requires repairing cracks or the like, is detected. That is, an ultrasonic flaw detection diagnosis, a light section method, a direct monitoring method or the like is used therefore. If a defect is confirmed, repairing is carried out, but the repairing method differs, depending upon a size, a shape of a part to be repaired, a degree of a defect and the like. If the defect is large or the like, the defect is completely removed by electric discharge fabrication, grinding or the like, and thereafter, build-up welding is carried out. Further, if a defect is small, build-up welding is directly carried out, and if a defect will be caused, the surface of the part is subjected to heat-treatment, or surface reformation such as shot-peening. After completion of repair welding, the quality of the repaired part should be monitored. For this purpose, a method of directly monitoring the welding part, a method of diagnosing the same with the use of ultrasonic flaw detection or the like is used.

The underwater processing apparatus 703 for carrying out the above-mentioned underwater work can incorporate various underwater working tools required for 5 carrying out the above-mentioned work, and also incorporates a moving means which can be moved in the X-, Y- and Z-axial directions and along a wall surface of a structure in the reactor. Thus, it can be moved freely and tracklessly in the underwater environment. The underwater working tools are fixed to a working tool fixing part 706 provided to the underwater working apparatus. Further, the underwater processing apparatus 703 incorporates a sucking part 705 using suckers or magnets in order to maintain a predetermined distance from a wall surface of a structure in the reactor.

A power is fed from a welding power source which is located outside of the pressure container 708 or a place which is not influenced by reactor water 714, and desired welding terms are provided from a control device (which is not shown). Thus, through a cable 704, the welding is carried out by the underwater working tool 703 by means of the underwater processing apparatus 701 located in the reactor water 714. The welding condition can be monitored by a monitoring camera (which is not shown) provided in the underwater processing apparatus 704.

Although the working tool fixing part 706 is provided outside of the underwater processing apparatus 703, it may be included in the underwater processing apparatus 704.

As to another part to be repaired in this embodiment, there are presented a gas-water separator 711, a core support board 712, the upper grid plate 709, a shroud support, a control rod housing, a control rod drive mechanism housing and the like.

It is noted that an underwater TIG welding device is used as the underwater working tool 701, but any of a laser welding device, a laser processing device, a laser surface reforming device, an ultrasonic flaw detecting device, an electric spark fabricating device, a grinder device, a shot-peening device, a water jet peening device or a structure in the combination thereof may be used. These underwater working tool 701 is selected in accordance with a working item such as check, inspection, fabrication, repairing, surface reformation or the like, and is secured to the working tool fixing part 706.

It is noted that the present invention is applied to a boiling water type nuclear reactor in this embodiment, but it may be of course applied to another light water reactor such as a pressurized water type nuclear reactor.

As to the tools for inspection and repair, that is, the underwater working tools 701, various tools other than those explained in this embodiment may be used.

Embodiment 5

Figure 9:
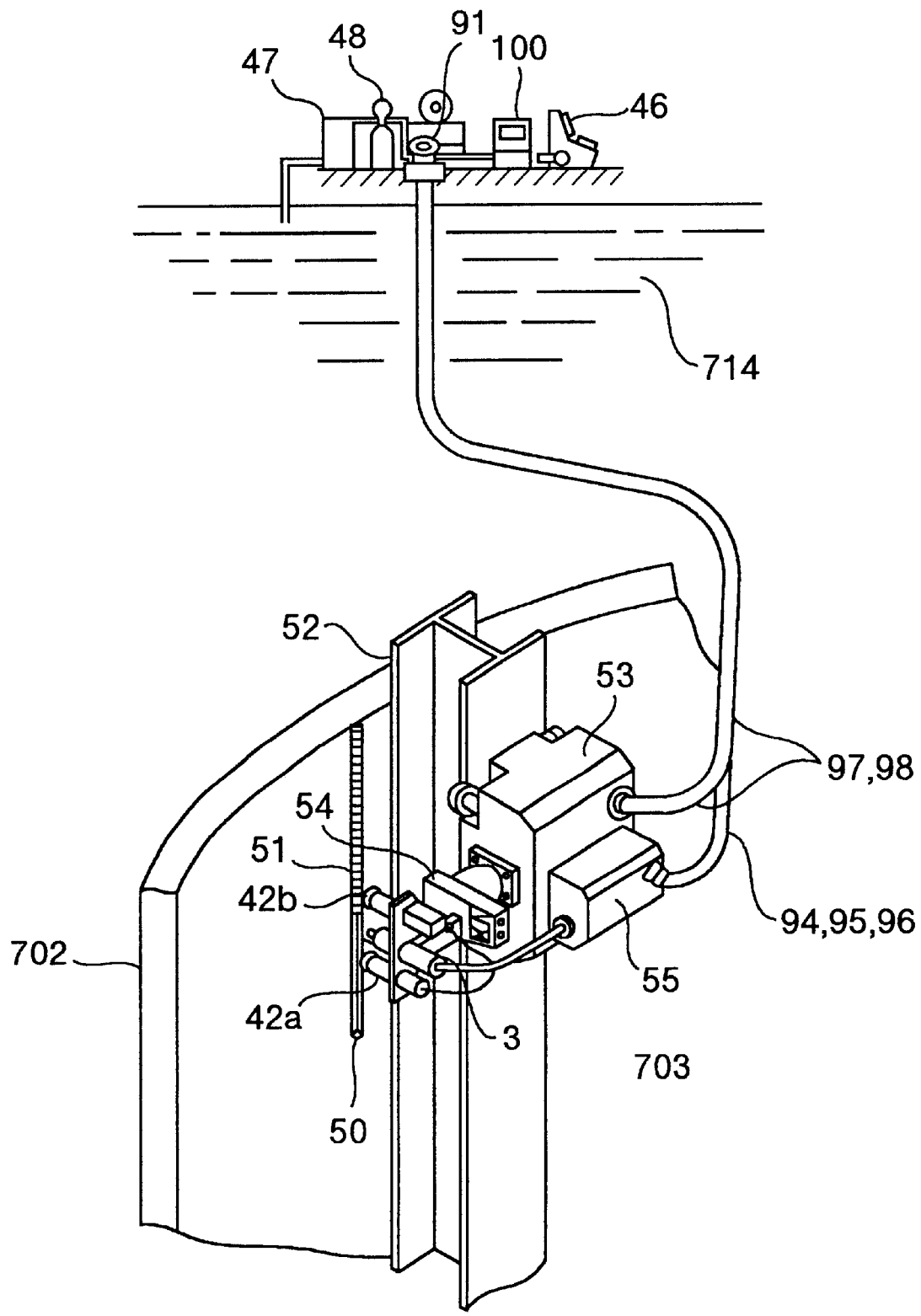
FIG. 9 is a view illustrating an entire arrangement of an underwater TIG automatic welding apparatus applied to a BWR plant shroud.

FIG. 9 is a perspective view illustrating an entire system for carrying out build-up welding for a shroud similar to the embodiment 4, with the use of an underwater TIG automatic welding device which travels on a track rail 52. An automatic welding device in this embodiment is small-sized so that it can enter gaps in an upper grid plate 709 together with the track rail 52.

By inputting arbitrary welding terms into a welding control device 46, electric power is fed from a welding power source to a welding torch 3, and a welding part which is fed thereto with arbitrary shield gas from a gas supply control device 48 and water from a water supply control device 47 is shielded with the shield gas in order to carry out welding. In this embodiment, monitoring cameras 42a, 43b are provided in front and rear of the welding part inside of the welding torch 3 explained in the embodiment 1, being integrally incorporated with the interior of the torch body, (each of them is shown in the figure), in order to monitor a processing condition. In the torch body, carbon felt is provided to the solid wall, similar to the embodiment 1. The underwater monitoring device 42a for confirming a welding position, and the underwater monitoring device 42b for monitoring a quality of the welding part 51 are located in front and rear of the welding torch 3. In this arrangement, the solid wall using carbon fibers is provided in order to obtain a stable cavity. It is noted that a solid image tube type small-sized CCD camera is used for each of the monitoring devices.

At first, the shape of a welding bevel and a welding position are confirmed by the underwater monitoring device 42a. an image picked up by the underwater monitoring device 42a is transmitted in the form of an electric signal to an image processing device 100. At this stage, a deviation value from an initial shape is calculated and determined. If the shape of the welding bevel is deviated exceeding a regulated value, a signal for changing the welding terms is delivered to the welding control device 46 so as to change the setting in order to obtain welding terms with which appropriate welding can be mad. Further, if the welding position is deviated exceeding a regulated value, a signal for correcting the deviation is delivered to the welding control device 53 so as to carry out welding at an appropriate position. In this case, the distance between the welding torch 3 and the underwater monitoring device 42a is confirmed to set a previous lag time.

The underwater welding system is mainly composed of the control device on the water and the welding device in the water. In the method of feeding a welding wire, it is fed from the device on the water to the underwater welding device through a push-pull feed method if the welding is carried out in a shallow part, but if the push-pull wire control device is difficult to be used since the depth is deep, the wire is directly mounted on the underwater welding device. The control device on the water is provided with the image processing device 100, the push side wire supply device 91, the welding control device 46, and the water supply control device 47. The reactor water 714 in the nuclear reactor is used as a water source as shown.

The control device on water and the welding device in water are connected therebetween through the intermediary of hoses including a welding wire feed conduit tube 94, a shield gas feed supply hose 95 and a water jet feed hose 96, and cables including a welding cable 97 and, a control cable 98. Further, in the underwater automatic welding device, a rail 52 is laid in parallel with the welding bevel 50 of the shroud 702, and a welding drive device 53 travels thereon so as to weld the shroud by the above-mentioned underwater welding method. The welding drive device 53 is incorporated therein with a position adjusting drive device 54 for adjusting the position of the welding torch (which will be hereinbelow refereed as "underwater welding torch) 3, vertically and laterally, and a pull side welding wire supply device 55. This underwater welding device is advantageous since it can weld for a long time.

Figure 10:
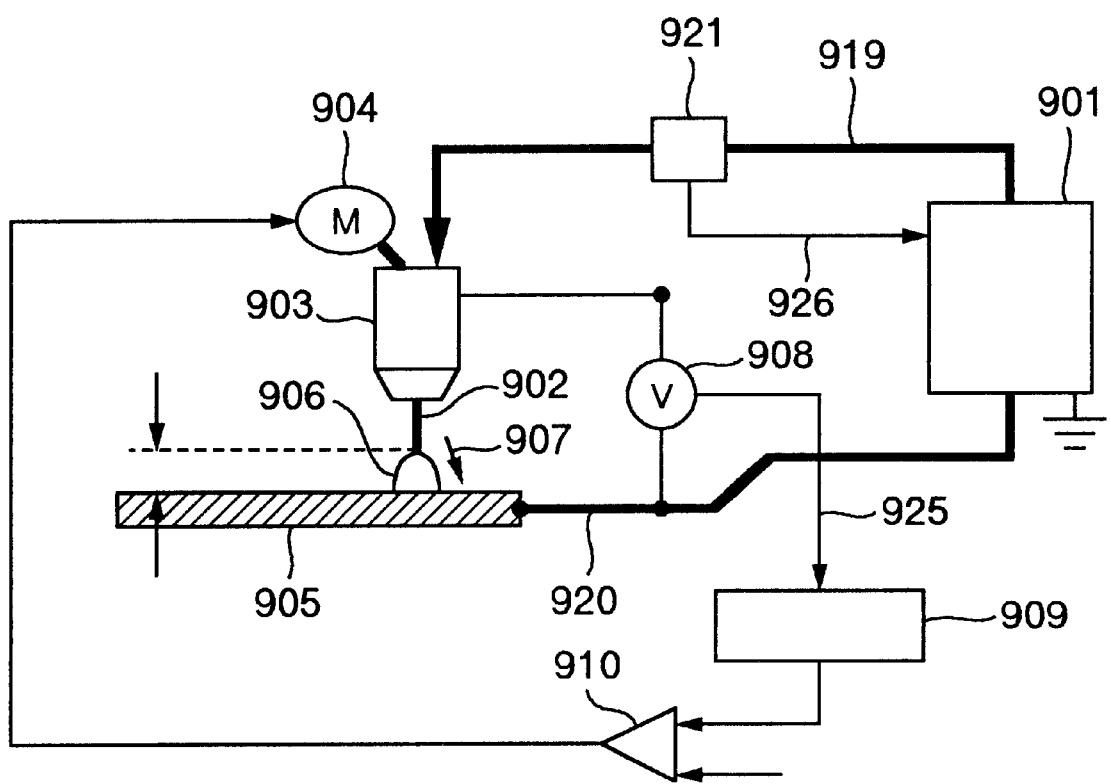
FIG. 10 is a view illustrating an arrangement of a high frequency pulse arc welding apparatus.

FIG. 10 is a view illustrating an arrangement of a high frequency pulse welding device using the underwater automatic welding device according to the present invention, and is composed of a pulse welding power source 901, a welding torch 903 incorporating an arc electrode 902, and a torch drive part 904. The arc electrode 902 is located being opposed to a part to be welded of the shroud 702. The torch drive part 904 (servo-motor) moves the welding torch back and force so as to adjust the length of an arc 906 produced between the arc electrode 902 and the shroud 905. The welding torch 903 jets shield gas surrounding the arc 906 in order to restrain partial oxidation in the welding part.

The pulse welding power source 901 and the welding torch 903 are connected together with a pulse current feed cable 919, and a pulse current detecting part 921 is provided therebetween. The pulse welding power source 901 delivers a constant power source pulse in accordance with a detection value 926 of a pulse current detected by the pulse current detecting part 921.

The pulse welding power source 901 and the shroud 905 are connected together with a pulse current feed cable 950, and an arc voltage detecting part 908 is provided between the pulse current feed cable 950 and the welding torch 903. A detection value of an arc voltage detected by the an arc voltage detecting part 908 is delivered to and processed in a turn-on time averaging part 909. A turn-on time averaged value of the arc voltage obtained through this process is delivered to a half-wave rectifying circuit 910, and is compared with an arc voltage reference value. The torch drive part 904 is driven by an output from the half-wave rectifying circuit 940. If the averaged value of the arc voltage coincide with the arc voltage reference value so that the output of the arc voltage comparing part 910 becomes zero, the adjusting drive of the torch drive part 904 is stopped.

The pulse welding power source 901 has a plurality of IGBTs so as to feed pulse current in a pulse frequency range from 1 to 25 kHz. By reducing the inductances of the power source circuit and the pulse current feed cable 19, there can be obtained a pulse current such that the current can rise up 500 to 0 amp. within a short time of 10 to 50 $\mu$sec., and similarly, a pulse current which can falls down within a short time from 0 to 500. The waveform of this pulse signal has a high peak value so as to have an angular shape such as a triangular shape or a trapezoidal shape having an inclined top side. The base current has a current value having a zero or less than $\frac{1}{10}$ of the peak value so as that the arc current is continuously fed with no interruption. This base current value is lowered to about $\frac{1}{5}$ of the conventional base current value. It is noted that the peak value of the pulse current is reasonably set to a value in a range of about 300 to 800 amp. in view of the directivity of the arc.

The turn-on time averaging part 909 is adapted to obtain a turn-on time averaged value over a time period from the rise-up starting point where the absolute value of the arc voltage having a predetermined polarity becomes greater than a predetermined value, to a fall-down ending point. The turn-on time averaging part 909 has a pulse width measuring circuit, an arc current integrating circuit and a computing circuit.

The pulse width measuring circuit sets an arc voltage reference value with the use of a comparator, and obtains a pulse width which occupies the time period from the rise-up starting point where the absolute value of the arc voltage having a predetermined polarity becomes greater than a predetermined value, to a fall-down ending point.

The arc voltage integrating circuit integrates an arc voltage during turn-on of a pulse, and holds during turn-off of the pulse. The computing circuit divides the integrated value with a pulse width Tp in order to obtain an averaged value of an arc voltage during turn-on of the pulse for every pulse. Further, it computes an averaged value among a plurality of pulses.

It is noted that the pulse width measuring device in the turn-on time averaging part 909 may be eliminated if a pulse width measuring circuit for a pulse current is incorporated in the welding power source 901.

Thus, the averaged value of the arc voltage in a time period in which the absolute value of the arc voltage exceeds the predetermined value Vb is obtained by the turn-on time averaging part 909, and the turn-on time averaged value of the arc voltage is compared with the arc voltage reference value so as to obtain a difference value therebetween. Then, the drive of the torch drive art 4 is controlled in accordance with the difference, and accordingly, the control of the arc length becomes satisfactory.

That is, the relationship between the averaged value of the arc voltage during the turn-on time period, which is obtained by the turn-on time averaging, and the arc length is exhibited by a slope A. On the contrary, the relationship between the averaged value of the arc voltage, which is obtained by conventional one periodical cycle, and the arc length is exhibited by a slope B. The gradients of these slopes A, B indicates arc voltage sensitivities which are ratios of a variation in the averaged value of the pulse arc voltage with respect to the variation in the arc length. The gradient of the slope A according to the present invention is larger than that of the conventional slope B, That is, it can be found to be highly sensitive.

The control of the torch drive part by which the arc length is adjusted on the basis of the averaged value of the pulse arc voltage which is highly sensitive is highly responsive, and accordingly, satisfactory control can be made.

Since the averaged value of the arc voltage during the turn-on time period of the pulse, according to the present invention becomes substantially constant since it is not influenced by a variation in the welding current. Accordingly, the averaged value of the arc voltage becomes less so as to prevent the arc voltage sensitivity from lowering, even though the welding is made by deceasing the welding current with a low input heat term, as understood a specific repair welding which will be explained hereinbelow, thereby the control of the torch drive can be satisfactorily carried out.

A specific repair welding of this embodiment was carried out as follow.

Figure 11:
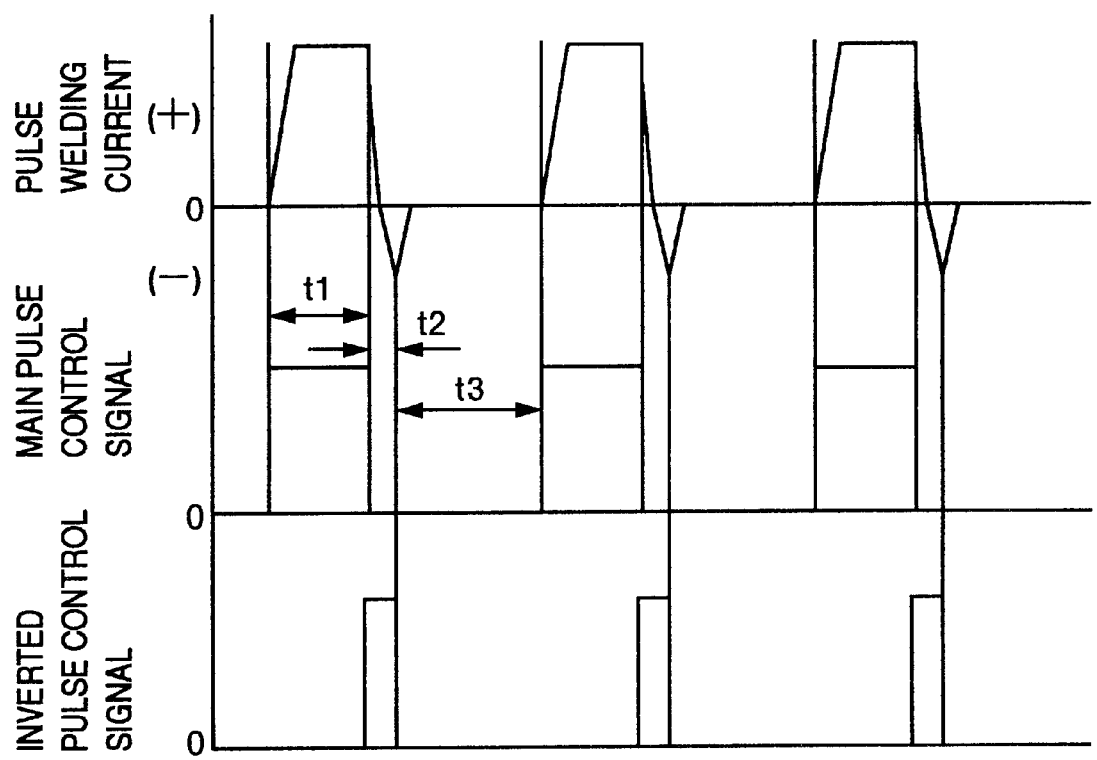
FIG. 11 is a view illustrating a waveform of high frequency pulse arc current and a waveform of a signal.

A welding method: TIG welding by feeding a SUS308L or SUS316L wire having a diameter of 0.6 mm; A shroud mother material: SUS304, SUS304L, SUS316L austenite stainless steel, having a thickness of 50 mm; A one side welding bevel V shape: a width of 10 mm, and a depth of 25 mm; A welding voltage: 120 V; A welding peak current 600 A; A period: 79 $\mu$sec, which are set to be constant. Further, t1; 50 $\mu$sec, t2; 4 $\mu$sec, t3; 25 $\mu$sec, and t1; 20 $\mu$sec, t2; 4 $\mu$sec, t3; 55 $\mu$sec were alternately changed over with intervals of 0. 25 sec so as to carry out welding with a low input heat. As a result, (refer to a pulse current waveform shown in FIG. 11), the averaged value (averaged arc pressure) was varied in synchronization with the change-over period, and accordingly, the welding metal was agitated so as to restrain the growth of grain. A build-up layer per pulse has a width and the height which are both equal to about 1 mm with the number of welding pulses of about 70 in this embodiment, so as to have a cross-sectional area of about 1.7 mm$^2$. The reverse pulse current was about on-half of the peak current. Further, the vibration of the high frequency pulse current restrained the growth of grain. The result of ultrasonic inspection of the workpiece which was welded under the above-mentioned terms, showed less HAZ in comparison with a workpiece which was welded by a conventional TIG welding process, and accordingly, the joint part and the mother material could be clearly discriminated. It is note that that the above-mentioned result was obtained by changing the energizing time (t1) of the main peak so as to change the averaged voltage (averaged arc pressure) while the change-over period was set to be constant. However, the similar result can be obtained by periodically changing the base current of t3 and the peak current of the main current.

The reason why stable build-up welding can be made even with a low input heat in order to carry out the underwater welding having a welding bevel, is such that the above-mentioned pulse welding is used, and as well, water can be effectively displaced from the welding torch during the welding. That is, with the use of the solid wall, water can be prevented from entering the welding torch only by feeding a small volume of inert gas, and further, with the water curtain and the inert gas, water can be prevented from entering the welding bevel. Thereby it is possible to eliminate a conventional disadvantage such the arc is instable due to feeing of a large volume of gas.

The build-up welding and other processes can be made even for those other than the shroud by high frequency pulse welding in this embodiment, similar to the above-mentioned embodiments.

According to the underwater processing device and the underwater processing method according to the present invention, the processing and inspection of a workpiece having surface ruggegdnes or a welding bevel and having a complicated shape can be carried out while the entrance of water into the shield can be effectively prevented, and further, the processing and the inspection with a high degree of reliability can be carried out with less variation of gas flow in the processing part or the inspecting part.

What is claimed is:

1. An underwater processing device having a shield means for locally covering a workpiece with gas in an underwater environment so as to process or inspect the workpiece while water is prevented from entering a shield, characterized in that said shield means comprises a solid wall composed of a member which is slidable in a part which makes contact with the workpiece, and making contact with the workpiece and adapted to be moved up and down by a pressing force, and a water jet means for forming a water curtain around the outer periphery of the solid wall.

2. An underwater processing apparatus characterized by a torch having an arc electrode, a torch body for supporting the torch, a solid wall provided on the workpiece side of the torch body so as to surround the entire circumference of the torch, and adapted to make contact with the workpiece and to be vertically movable by a pressing force, a water jet nozzle provided in the torch body, at the outer periphery of the solid wall, and a shield gas supply means provided in the torch body, for jetting nonoxidative gas into the torch body so as to cover a processing part of the workpiece with the nonoxidative gas.

3. An underwater processing apparatus characterized by a laser torch for emitting a laser beam, a torch body supporting the torch, a solid wall provided on the workpiece side of the torch body so as to surround the entire circumference of the torch, and adapted to make contact with the workpiece and to be vertically movable by a pressing force, a water jet nozzle provided in the torch body, at the outer periphery of the solid wall, and a shield gas supply means provided in the torch body, for jetting nonoxidative gas into the torch body so as to cover a processing part of the workpiece with the nonoxidative gas.

4. An underwater processing apparatus as set forth in claim 1, characterized in that at least one of a pressure sensor for detecting a pressure of gas in the shield, an optical monitoring device for optically monitoring a processing condition in the shield, and an illumination device for illuminating the interior of the shield, is provided in the torch body.

5. An under water processing apparatus as set forth in claim 1, characterized in that said processing is either one of welding, cutting, electric discharge machining and grinding with a device therefor.

6. An underwater automatic processing apparatus characterized by an underwater processing device in which a workpiece is locally covered with a shield member in an underwater environment, the shield member being filled with gas, for inspecting or processing the workpiece while the workpiece is covered with a water curtain jetted from a water jet nozzle at the outer periphery of the shield member, a gas supply device for feeding the gas into the shield member, a water supply device for supplying water into the water jet nozzle, a drive device integrally incorporated with the underwater processing device, for driving the underwater processing device along the workpiece to be inspected or processed, and a control device for carrying out the inspection and the processing along with a previously stored program.

* * * * *